United States Patent [19]
Asakawa et al.

[11] Patent Number: 5,754,780
[45] Date of Patent: May 19, 1998

[54] APPARATUS AND METHOD FOR PERFORMING SERIAL COMMUNICATION BETWEEN MASTER AND SLAVE DEVICES

[75] Inventors: Teruo Asakawa; Akiyoshi Shoujima; Shigeru Ishizawa, all of Yamanashi-ken, Japan

[73] Assignee: Tokyo Electron Limited, Tokyo, Japan

[21] Appl. No.: 374,817

[22] Filed: Jan. 19, 1995

[30] Foreign Application Priority Data

Jan. 19, 1994 [JP] Japan .................................. 6-018868
Jan. 19, 1994 [JP] Japan .................................. 6-018869

[51] Int. Cl.$^6$ .......................... G06F 15/80; G05B 15/00
[52] U.S. Cl. .................. 395/200.38; 395/200.39; 364/132
[58] Field of Search .......................... 395/200.05, 200.38, 395/200.39, 200.4, 200.76, 891, 290, 800.31; 364/132

[56] References Cited

U.S. PATENT DOCUMENTS

| 4,742,484 | 5/1988 | Yanai et al. .................. 364/900 |
| 4,984,190 | 1/1991 | Katori et al. .................. 364/900 |
| 5,206,937 | 4/1993 | Goto .................................. 395/325 |
| 5,555,548 | 9/1996 | Iwai et al. ...................... 375/356 |

OTHER PUBLICATIONS

Black, "Data Communications, Networks, and Distributed Processing," Reston Publishing Co., Reston VA, pp. 209–225. Dec. 1983.
Mano, "Computer System Architecture, 2d Ed.", Prentice-Hall, inc., Englewood Cliffs, NJ, pp. 434–435. Dec. 1982.
Schwaderer, "Modems and Communication on the IBM PCs", John Wiley & Sons, Inc., New York, pp. 8–17. Dec. 1986.

*Primary Examiner*—Mark H. Rinehart
*Attorney, Agent, or Firm*—Oblon, Spivak, McClelland, Maier & Neustadt, P.C.

[57] ABSTRACT

A communication method and apparatus for performing communication between a master device and a plurality of slave devices, prepares, in the master device, the address data of a destination and operation command data to be transmitted to the destination, serially transmits the address data and the operation command data to the plurality of slave devices via the communication path, and executes an operation in accordance with the operation command data in at least one of the slave devices which is designated by the address data. The above operations are all performed in one bus cycle of the master side controller.

25 Claims, 15 Drawing Sheets

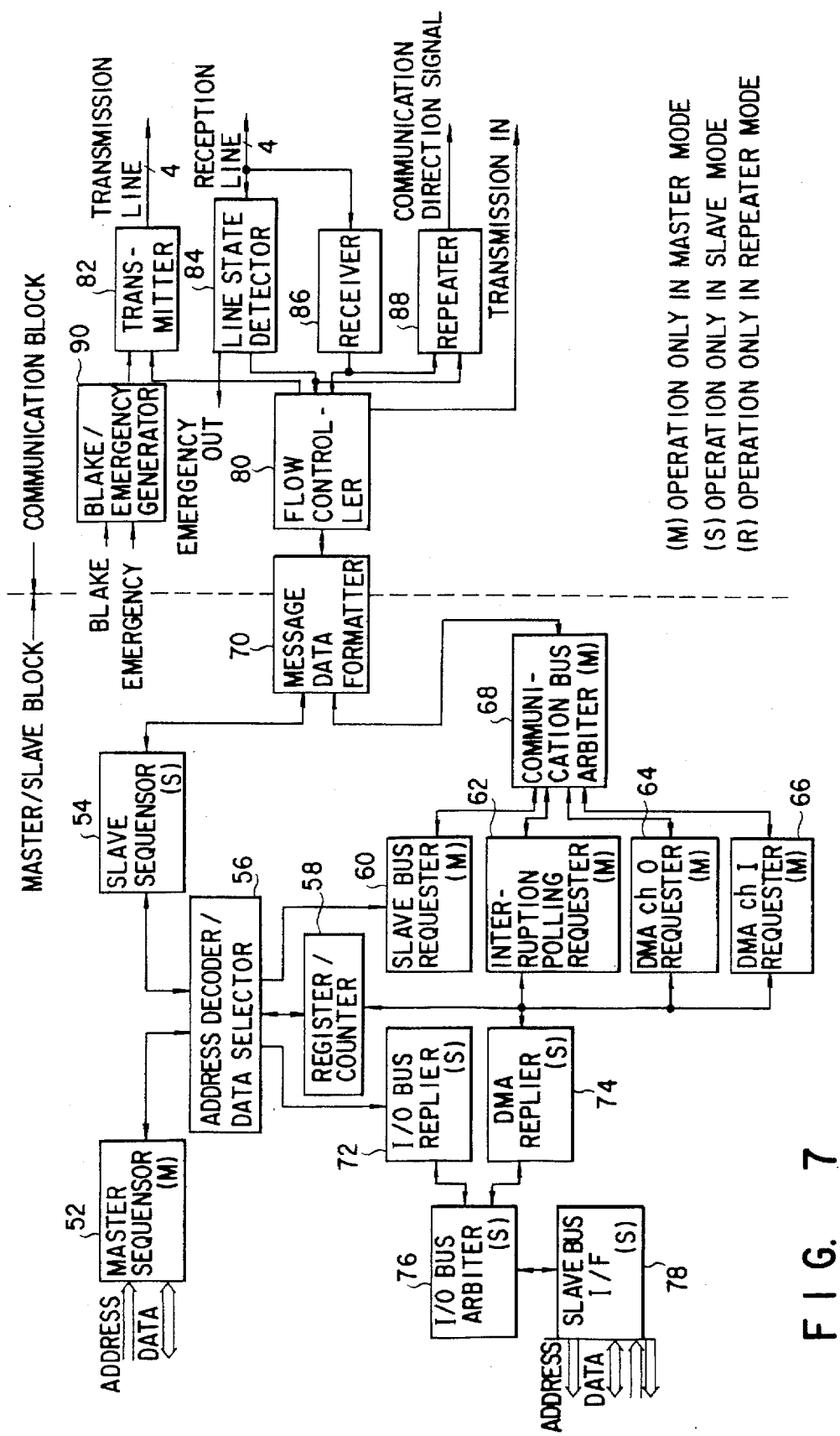
F I G. 7

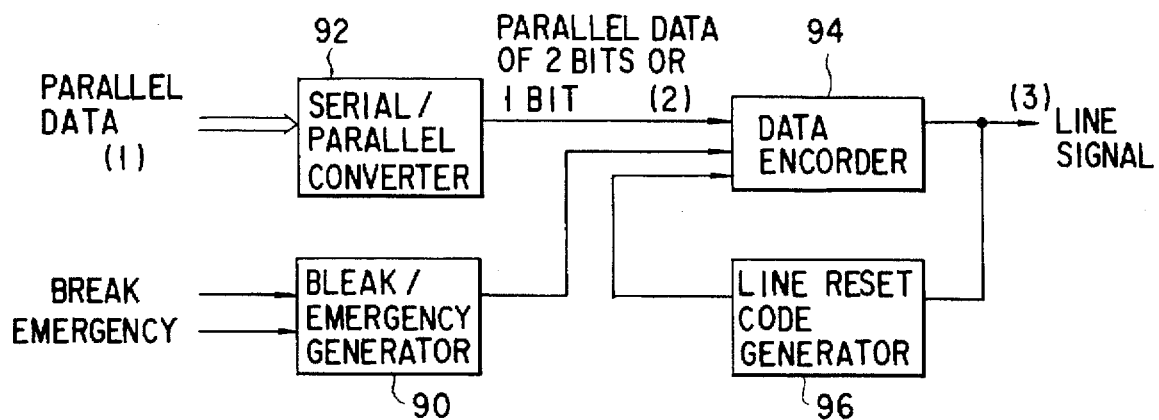
F I G. 8
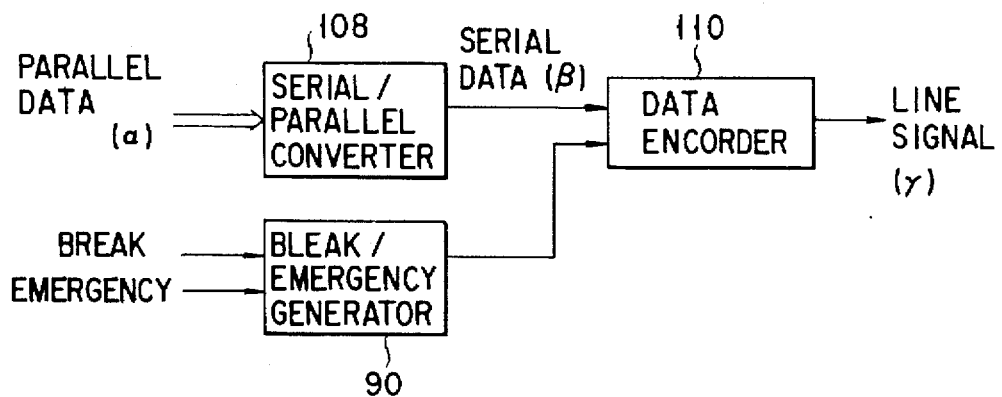
F I G. 10

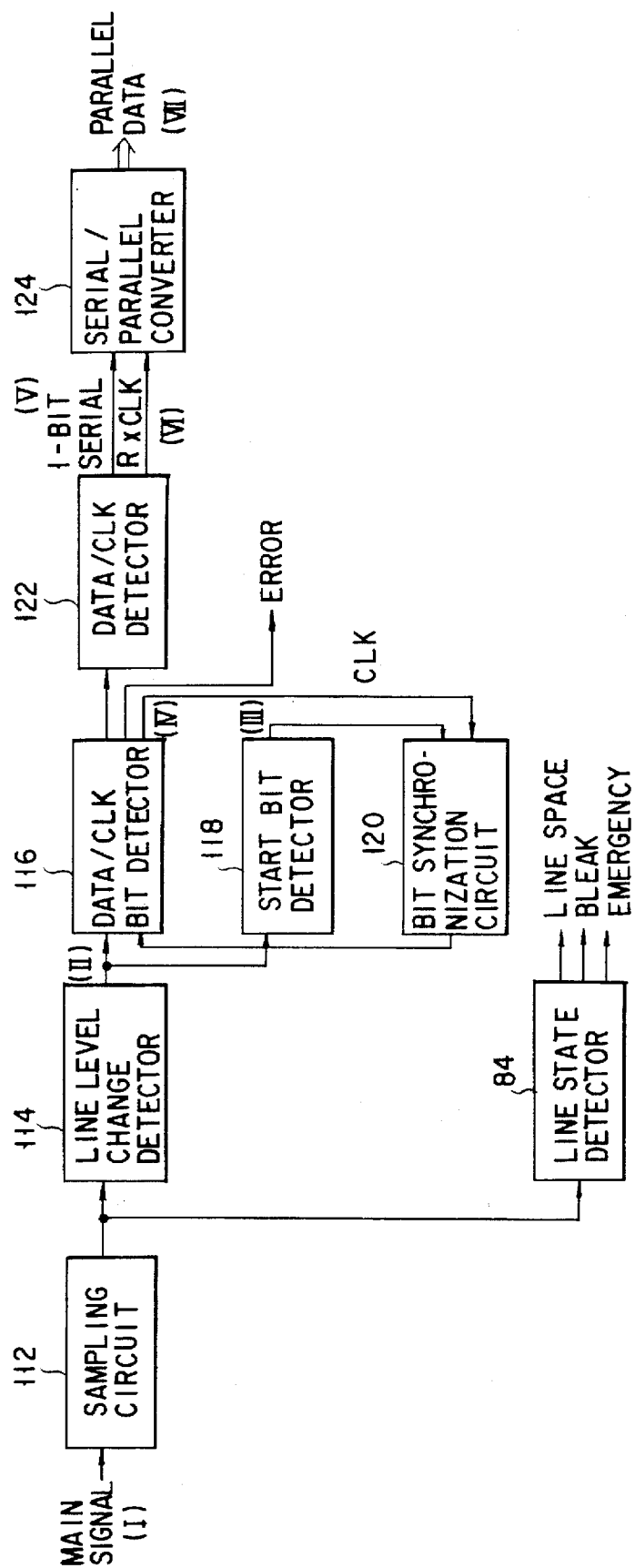
F I G. 11

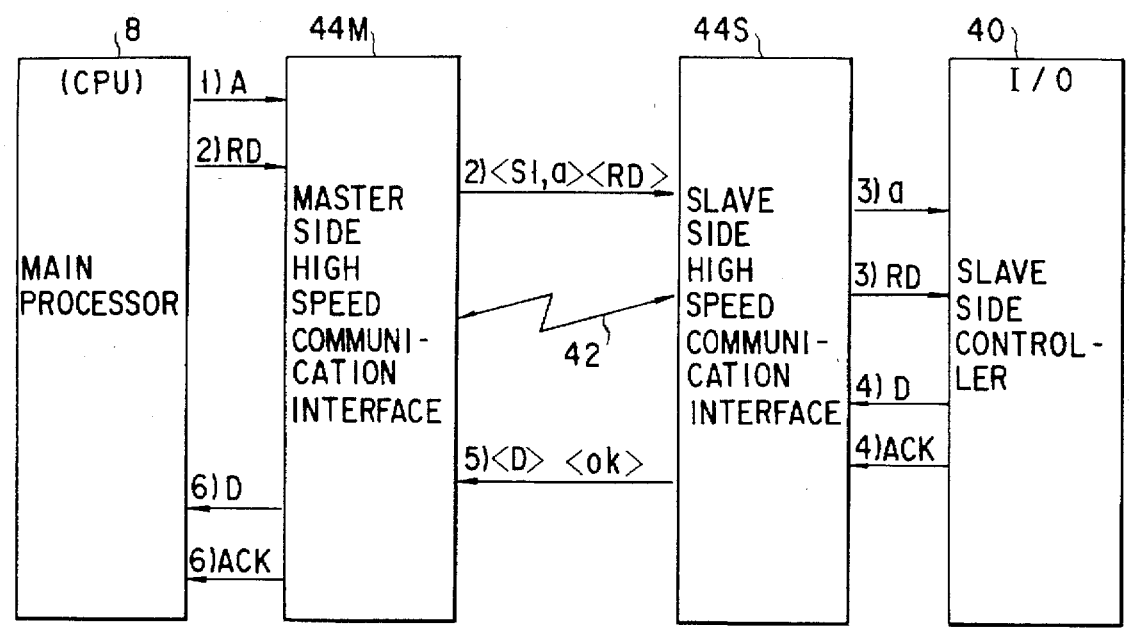
F I G. 12
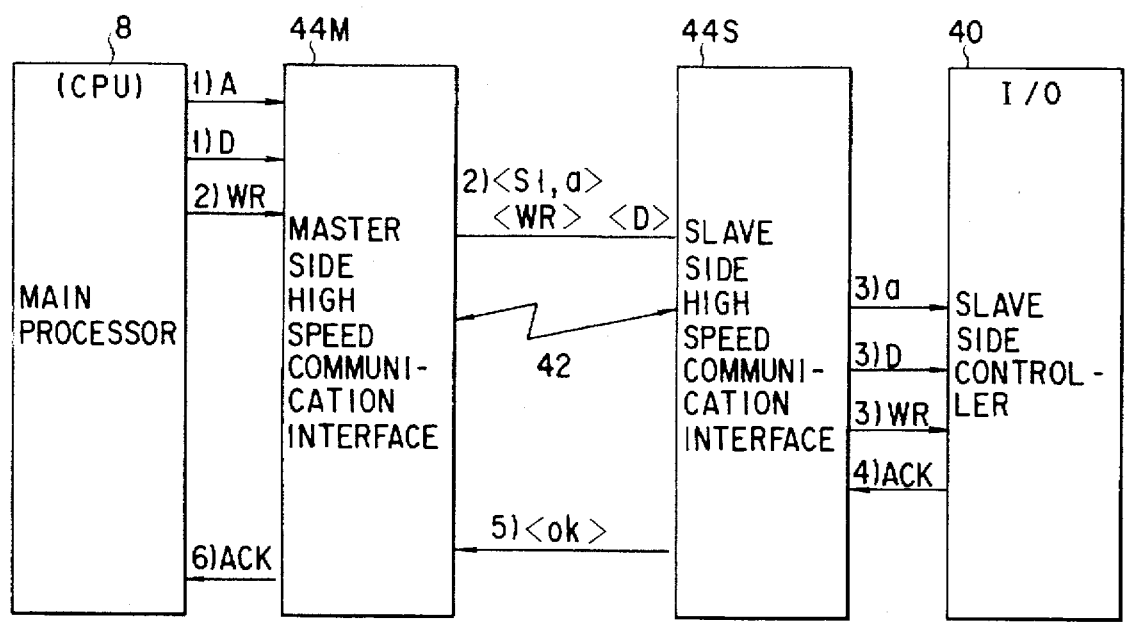
F I G. 13

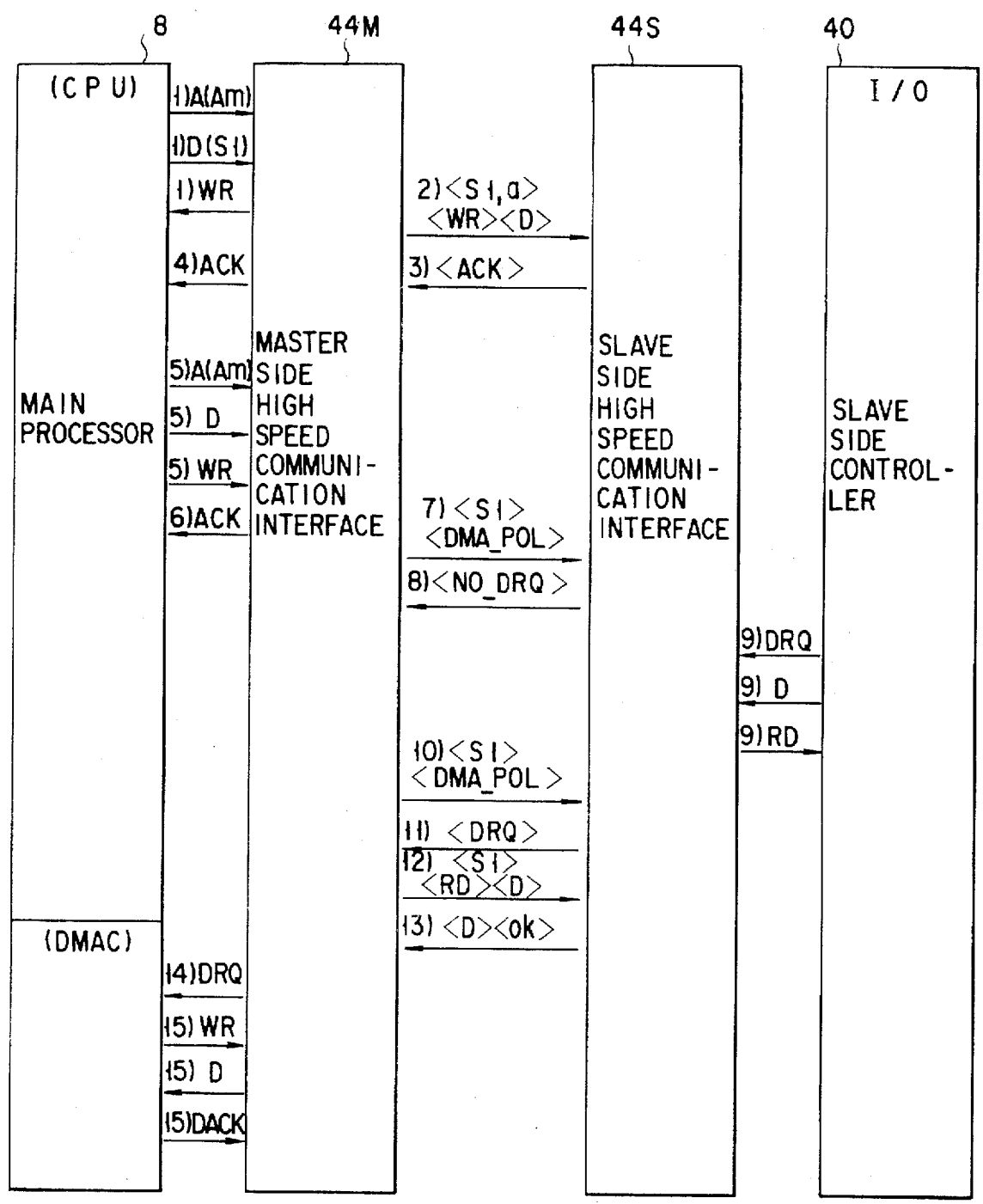
F I G. 15

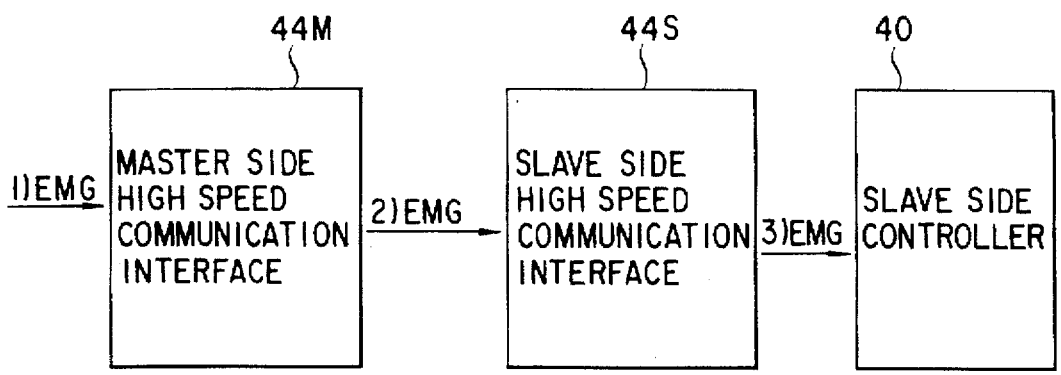
F I G. 16A
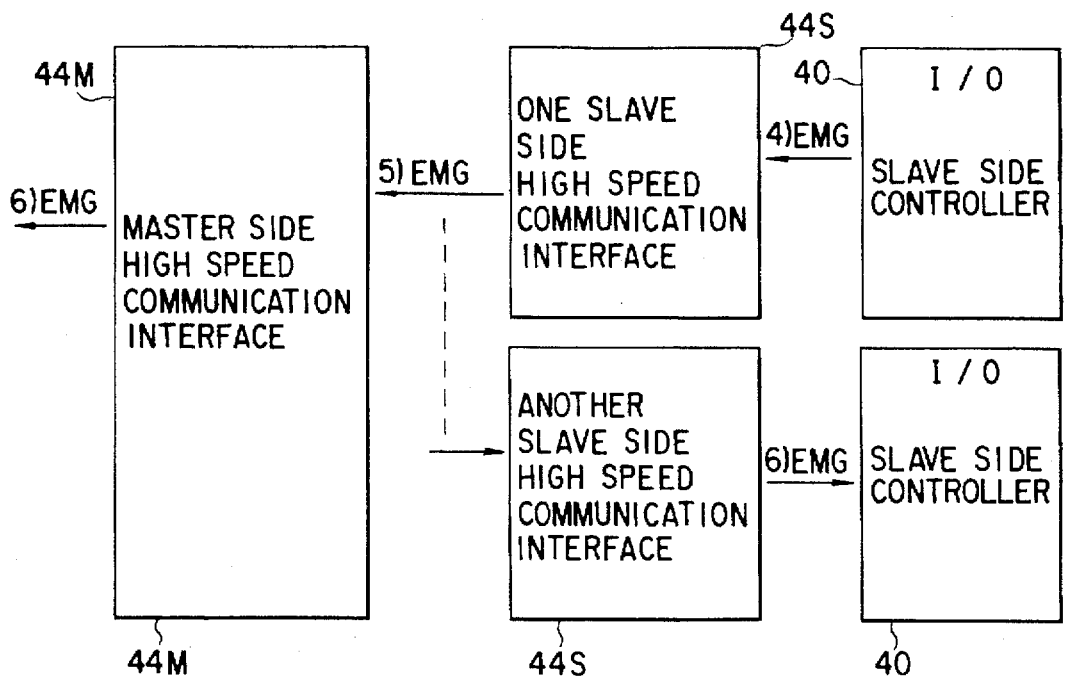
F I G. 16B

APPARATUS AND METHOD FOR PERFORMING SERIAL COMMUNICATION BETWEEN MASTER AND SLAVE DEVICES

BACKGROUND OF THE INVENTION

1. Field of the Invention

The present invention relates to a communication method and apparatus for use in a middle or short transmission path, such as a transmission path in a semiconductor equipment for manufacturing semiconductor devices.

2. Description of the Related Art

Generally, a semiconductor equipment, which subjects semiconductor wafers to various processes (e.g., a CVD process or an etching process), is provided with a motor, a vacuum gauge, a gas flow meter, various sensors and an actuator. These devices be controlled accurately and detected values from the sensors must be quickly fed back.

At present, since the semiconductor equipment is highly complex, the number of the aforementioned devices to be controlled has increased to several hundreds. For this reason, a signal should be quickly transmitted between input/output terminals (I/Os) of a master controller for controlling operations of the overall equipment and slave terminals. Recently, in particular, a plurality of manufacturing machines, for performing processes of the same or different kind, have been integrated, i.e., a cluster tool is formed in order to perform the processes efficiently. In this case, the master controller must integrally control the overall cluster tool, and thus, a demand for faster transmission is increased.

A conventional transmission method in a semiconductor equipment will be described hereinafter.

FIG. 1 shows a structure of a dispersion type control system, in which an I/O group is divided into a plurality of modules, and slave side processors 2 for controlling the I/O modules are provided near the I/Os. Each of the slave side processors 2 is connected through a middle/low speed communication channel 4 (e.g., a communication channel in conformity with RS232C standards) to a main processor 8 of a master controller 6 for controlling the overall operation. The I/Os of the slave terminals are controlled collectively in units of module.

However, this system is disadvantageous in that a program must be provided for each of the individual slave side processors 2 having different functions, thus entailing a considerable amount of time and work for program preparation. In addition, since the transmission rate of the communication channel 4 connecting the main processor 8 and the slave side processors 2 is relatively low, the slave side processors cannot be controlled quickly.

FIG. 2 shows a structure of a centralized controller system, in which long transmission paths 10, drawn from, for example, a digital input DI, a digital output DO, an analog input AI, an analog output AO and to-be-controlled devices such as a motor, are connected to a plurality of I/O units arranged on the side of a master controller 6, and the I/O units are connected to a main processor 8 through a system bus 14.

However, this system is disadvantageous in that, since the master controller 6 is directly connected to the to-be-controlled devices through the relatively long transmission paths, a considerable number of wires, interconnected in units of hundreds, are required. Further, since the wires are relatively long as mentioned above, noise is liable to be mixed into a high-speed signal or an analog signal, particularly when the apparatus is large in size. The system is thus disadvantageous in terms of resistance to noise.

To eliminate the disadvantages, there is provided a system in which a number of I/Os in the slave terminals are collected and digitized, and data is transmitted to the controller for synthetically controlling the semiconductor equipment via a reliable transmission medium. This system is classified into two types in accordance with transmission mediums.

One of the types is a dispersion type control system, which is shown in FIG. 3. In this system, I/O units 12 are arranged near to-be-controlled devices and connected to each other via a CPU bus 16. The bus 16 is connected to a main processor 8 of a main controller 6 through parallel transmission lines 18, each constituted by, for example, about 100 wires. Board type interfaces 20 are respectively inserted between parallel transmission lines 18 and the main processor 8 and between the parallel transmission lines 18 and the CPU bus 16, so that the main processor 8 and the CPU bus 16 are separated from each other.

With this structure, since the CPU bus is expanded, data can be written in or read from the I/O units 12 in one bus cycle of the main controller 6, with the result that a high-speed operation and a satisfactory resistance to noise can be obtained. However, this type of system is disadvantageous in that the thick and long parallel transmission lines 18 having about 100 wires must be arranged in the semiconductor equipment.

The other one of the types is a dispersion type control system using an exclusive communication interface, which is shown in FIG. 4. In this system, communication interfaces 22 and 23, each having an intelligent type LSI, are respectively provided for I/O units 12 and a main processor 8. The communication interface 23 on the master controller side is connected to the communication interfaces 22 on the slave sides through a serial communication path 24 having, for example, 8 to 10 wires.

This system is advantageous in that the number of wires in the relatively long serial communication path 24 is less than that in the system shown in FIG. 1. However, since data is transmitted serially, the transmission speed is low and therefore an exclusive processor must be provided in the main processor 8. The exclusive processor must perform different processes with respect to the I/O units for simply processing port data, such as DI/DO and AI/AO, and the intelligent type LSI for interpreting a command of a motor controller or the like. Therefore, the procedure in the exclusive processor is inevitably complicated.

Moreover, since the main processor 8 cannot directly access the I/Os in the slave terminals, it is necessary to prepare software in which time lag is taken into consideration, resulting in an increase in software preparation cost. This problem is serious particularly in a case where an intelligent type LSI is used.

Further, when the main processor 8 controls the overall system with reference to an I/O unit, it outputs a plurality of types of commands, which are received by the communication interface 23 on the side of master controller 6. The interface 23 analyzes the plurality of received commands and then serially outputs commands based on the analysis results to the communication interfaces 22 on the slave side. Hence, a period of time corresponding to a plurality of bus cycles is required to make reference to the I/O unit and it is thus impossible to execute a process quickly.

Furthermore, in the case of a multitask and multiprocessor, an interface (normally, a dual port memory) to the exclusive processor must be exclusively controlled, resulting in a complicated procedure.

In the communication system as shown in FIG. 4, to achieve communication between the main processor and the interface 22, a number of connection commands should be transmitted between the main processor 8 and the communication interface 23 on the master side over a plurality of times, i.e., the number of external reference cycles of the CPU in the main processor 8, to activate the interface 22. Such communication requires a considerable period of time, with the result that the I/O units cannot be controlled quickly.

SUMMARY OF THE INVENTION

An object of the present invention is to provide communication method and apparatus for transmitting data between a master controller and a plurality of slave terminals in a period corresponding to one bus cycle.

According to an aspect of the present invention, there is provided a communication method for performing communication between a master device and a plurality of slave devices, comprising the steps of: preparing, in the master device, at least an address data of a destination and operation command data to be transmitted to the destination; transmitting the address data and the operation command data in series to the plurality of slave devices through a communication path; and executing at least one of data writing and reading in at least one of the slave devices corresponding to the address data, in accordance with the operation command data, and the above steps being completed within one bus cycle of the master device.

According to another aspect of the present invention, there is provided a communication apparatus comprising: a communication path; a master side controller for preparing address data of a destination and operation command data to be transmitted to the destination; a master side interface, connected to the master side controller, for converting the address data and the operation command data supplied from the master side controller to serial data and serially transmitting them to the communication path; and a plurality of slave side controllers connected to the mater side interface via the communication path and designated by the address data transmitted from the master side interface, the slave side controllers including at least one slave side controller for executing at least one of message data writing and reading in accordance with the operation command data, wherein operations of preparing the address data of the destination and the operation command data to be transmitted to the destination, serially transmitting the address data and the operation command data to the plurality of slave side controllers via the communication path, and executing at least one of the message data writing and reading in accordance with operation command data in the slave side controller corresponding to the address data, are performed in one bus cycle of the master side controller.

According to the method and apparatus of the present invention, when data is transmitted to the communication path, data is encoded at regular intervals in accordance with a variation in level of a signal transmitted in one of the communication lines of the communication path.

With the present invention, when the master side controller makes reference to a slave side controller, it outputs an address, data and a command for reading or writing, so that a high-speed communication interface on the master side immediately accesses the slave side controller a high-speed communication interface on the slave side. Data can be read from the I/O unit controlled by the slave side controller or written in a predetermined address of the I/O unit.

This communication operation can be performed within one bus cycle of the master side controller, i.e., one external reference cycle. Accordingly, the communication speed can be improved and a quick control can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 7 is a block diagram showing a high-speed communication interface used in the communication system shown in FIG. 5;

FIG. 8 is a block diagram showing a GCC code transmission unit;

FIG. 10 is a block diagram showing an MMC code transmission unit;

FIG. 11 is a block diagram showing an MMC code reception unit;

FIG. 12 is a diagram showing a communication procedure in a read cycle according to the method of the present invention;

FIG. 13 is a diagram showing a communication procedure in a write cycle according to the method of the present invention;

FIG. 15 is a diagram showing a communication procedure in a DMA cycle according to the method of the present invention;

FIGS. 16A and 16B are diagrams showing a communication procedure in an EMG cycle according to the method of the present invention;

DETAILED DESCRIPTION OF THE PREFERRED EMBODIMENT

Figure 1:
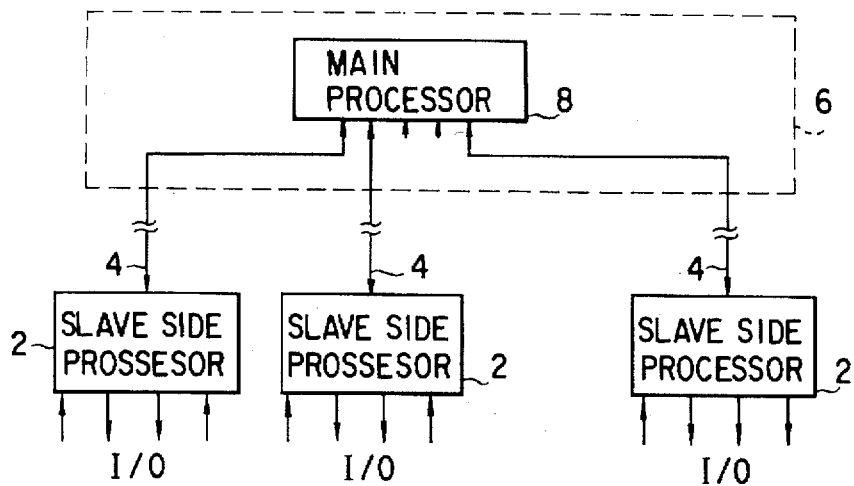
FIG. 1 is a diagram showing a conventional dispersion type controller system.
Figure 2:
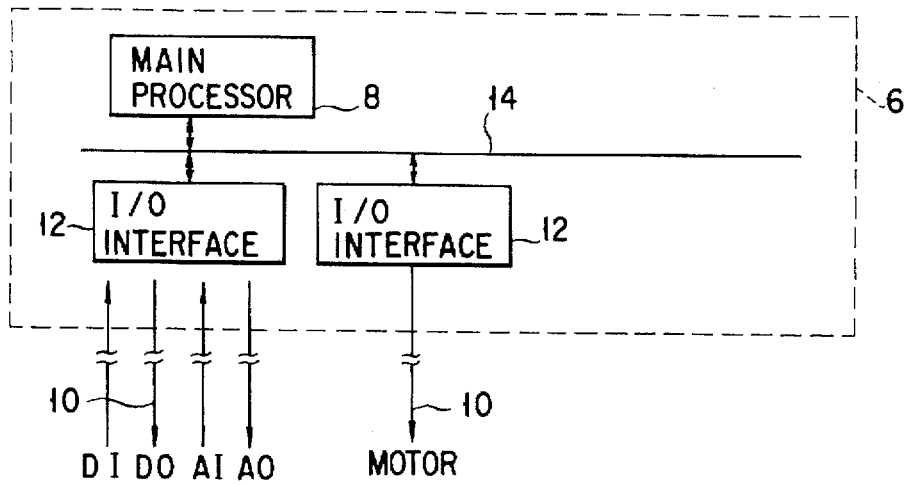
FIG. 2 is a diagram showing a conventional centralized control system.
Figure 3:
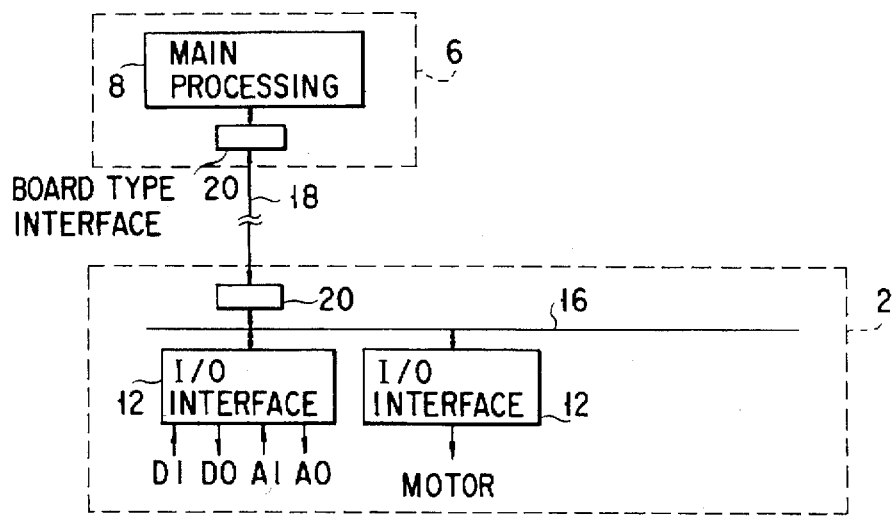
FIG. 3 is a diagram showing an I/O cluster control system having an expanded CPU bus.
Figure 4:
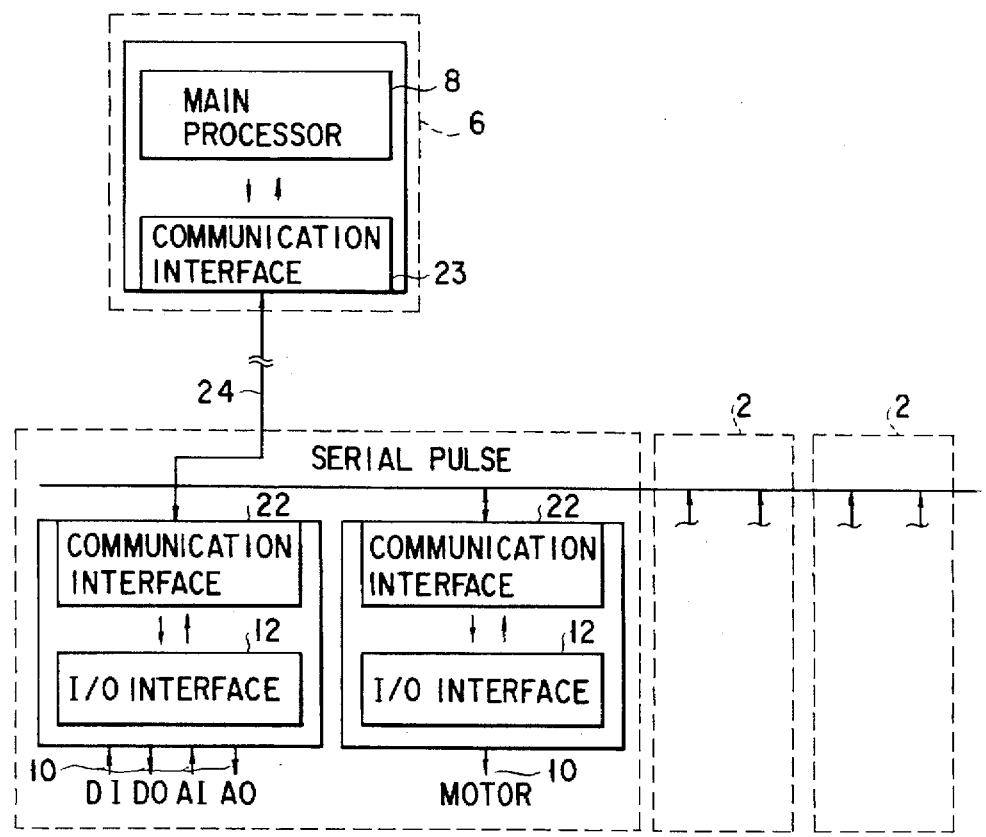
FIG. 4 is a diagram showing a conventional I/O cluster control system using an exclusive communication interface.
Figure 5:
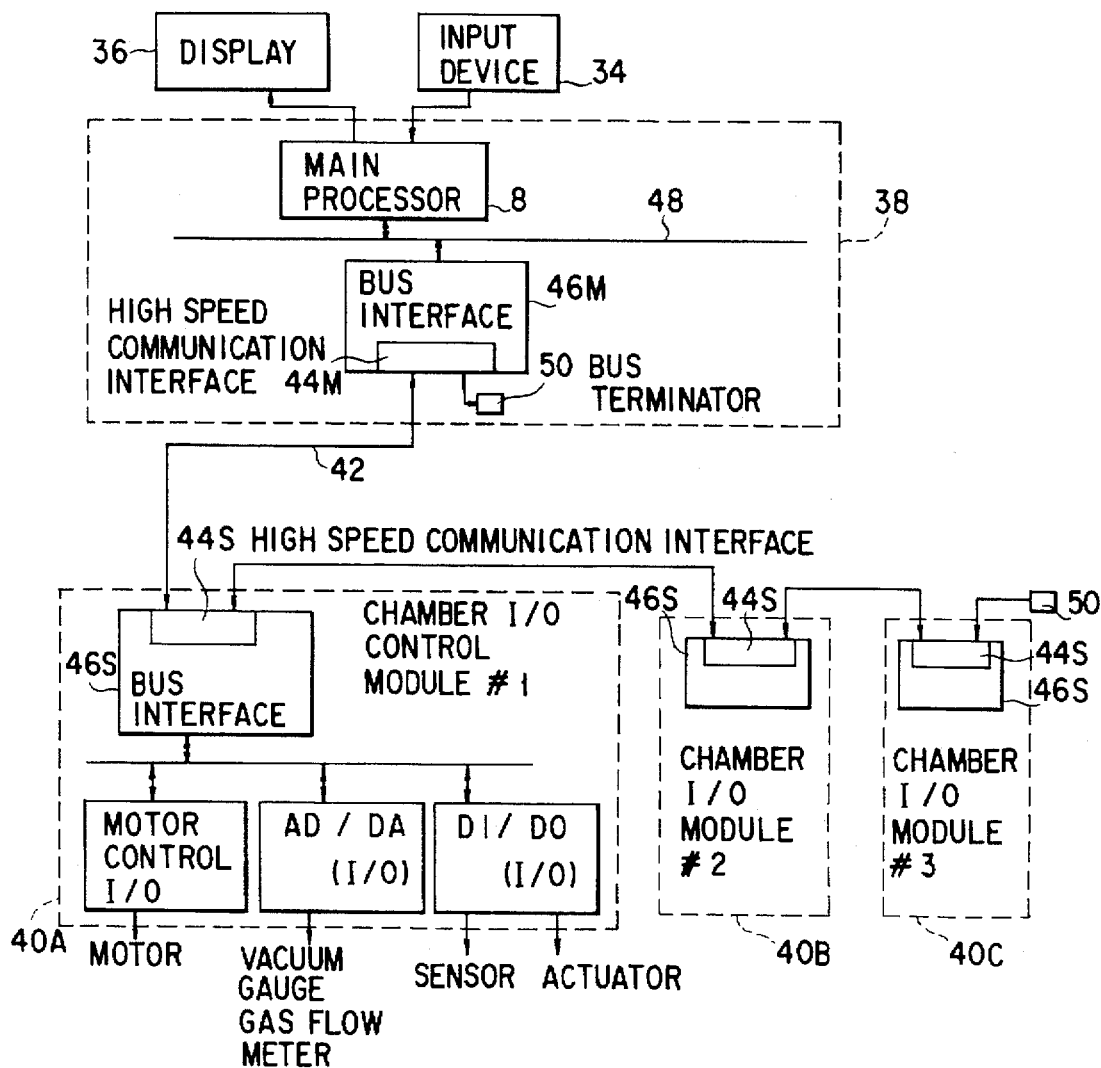
FIG. 5 is a block diagram showing a communication system for executing the method of the present invention.
Figure 6:
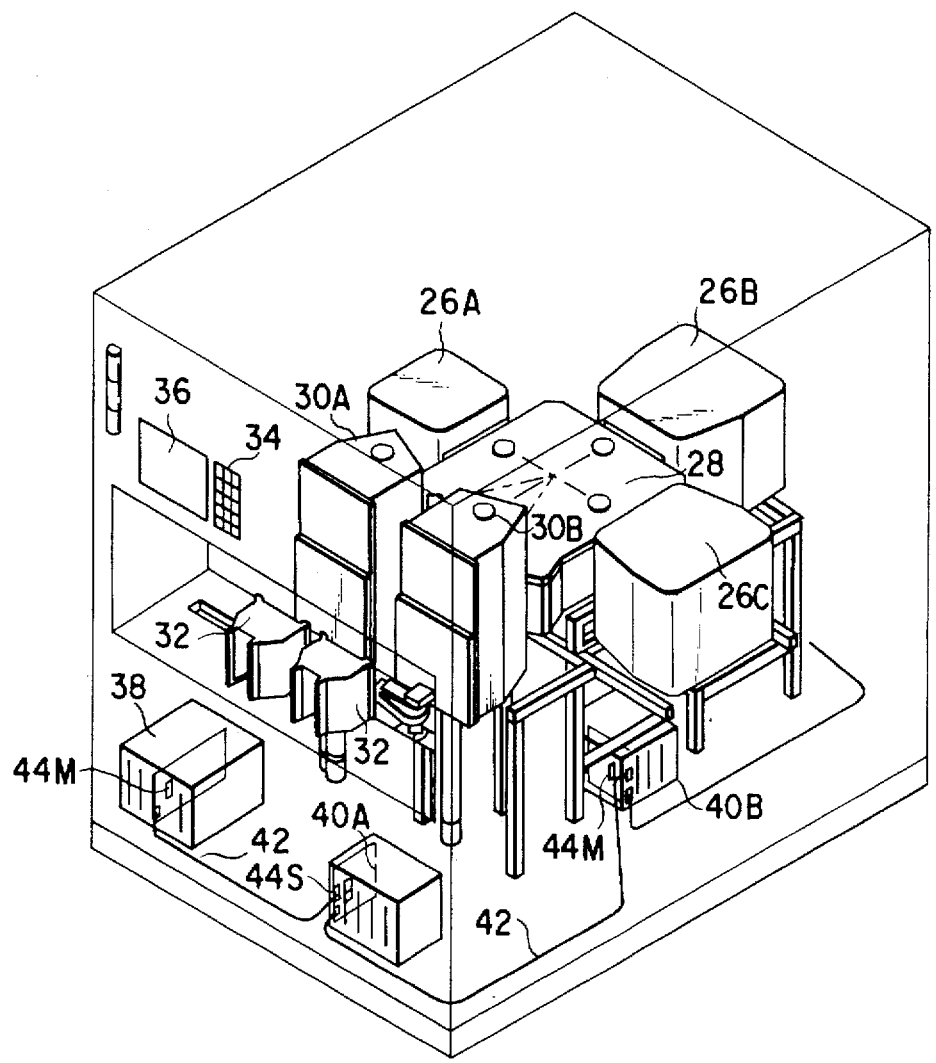
FIG. 6 is a diagram showing the appearance of a semiconductor equipment, in which the communication system shown in FIG. 5 is applied.

FIG. 5 shows a communication system for executing work the method of the present invention. FIG. 6 shows an appearance of a semiconductor equipment in which the communication system shown in FIG. 5 is applied. The equipment shown in FIG. 6 is a so-called cluster tool in which a plurality of (e.g., three) treatment machines 26A, 26B and 26C of the same or different type are collected and combined. The treatment machines communicate, via gate valves or the like, with a transport chamber 28 which is arranged in a central portion of the equipment and includes a transport arm (not shown). The transport chamber 28 communicates with two cassette chambers 30A and 30B in the same manner. Cassettes 32, for storing untreated or treated wafers, are arranged in front of the cassette chambers 30A and 30B. A front panel of the semiconductor equipment has an input unit 34, through which data is input to the to-be-controlled devices in the equipment via a central processing unit (CPU), and a display 36.

In the equipment, wafers are transmitted between the treatment machines via the transport chamber 28, thereby improving the efficiency of the treatment. In each of the machines, a vacuum gauge, a gas flow meter, various sensors and an actuator must be controlled. In addition, a vacuum system of the transport chamber 28 and the cassette chambers 30A and 30B, movable elements and the gate valves for dividing the space must be collectively controlled. For this purpose, the equipment comprises a master side controller 38 including a CPU module. Further, I/Os of the treatment machines, the transport chamber, the cassette chambers and the like are modularized, thereby forming a plurality of slave side controllers 40. The slave side controllers 40 are connected to the master side controller 38 through a serial communication path 42, so that centralized control can be achieved.

In FIG. 6, the master side controller (CPU module) 38 and first and second slave side controllers (chamber I/O control modules) 40A and 40B are shown as examples. The number of the slave side controllers can be varied depending on the size of an overall equipment. For example, 31 modules at maximum can be connected to the master side controller.

The three dimensions of the equipment as a whole are at most several meters. Since, therefore, the serial communication path 42 connecting the modules is not very long, middle or short-distance (e.g., tens of meters) transmission is performed in the equipment.

As is also shown in FIG. 5, each of the modules 38, 40A, 40B, 40C . . . includes a well-known bus interface 46M or 46S, including a high-speed communication interface 44M or 44S. The module also includes a I/O port interface. The bus interface 46M on the master side is connected to the CPU through a CPU bus 48. The bus interface 46S or the I/O port interface of each module on the slave side is connected to a motor control I/O, an AD/DA converting I/O for AD (analog-to-digital) or DA (digital-to-analog) converting signals output from the vacuum gauge and the gas flow meter, a memory and a digital I/O unit of a sensor and an actuator. The slave side controllers are serially connected so as to form a network, or a multi-drop. A bus terminator 50 is connected to the final stage of the slave controllers.

The structure of the high-speed communication interfaces 44M and 44S will now be described with reference to FIG. 7. All the high-speed communication interfaces 44M and 44S have the same structure integrated in one chip.

Each high-speed communication interface includes a master/slave block (MS block) and a communication block.

The master/slave block (MS block) mainly performs the following functions: interface with an exterior of the chip, such as a master side CPU (in a master mode) and the slave I/O bus (in a slave mode); generation of a communication request signal and transmission message data; and interpretation and execution of a received message.

Function blocks in the MS block will be described below. In FIG. 7, [M] represents blocks which operate only in the master mode, [S] represents blocks which operate only in the slave mode, and [R] represents blocks which operate only in a repeater mode.

A master sequencer 52 receives an address and also receives and transmits data. It has a function of controlling all the operations in the MS block in reply to an access from the CPU in the master mode and returning a response to the CPU.

A slave sequencer 54 has a function of controlling all the operation in the MS block in reply to a request from the communication block and returning a response to the communication block.

An address decoder/data selector 56, connected to the master sequencer 52 and the slave sequencer 54, selects whether a request from the master sequencer or the slave sequencer is to access a register/counter 58 or a slave I/O bus, and outputs an access request to a corresponding function block.

The register/counter 58, connected to the address decoder/data selector 56, comprises all registers and counters required in the chip, such as control, error, and status registers, a timer and a DMA (Direct Memory Access) transmission counter. The register/counter 58 also includes a port of the DI/DO which operates in a slave port mode.

The MS block includes the following four requester blocks for supplying an access request to the communication block. The requester block operates only in the master mode.

A slave bus requester 60 is a block for outputting a direct communication access request to the slave side in reply to a request from the CPU. The access includes access to a slave register, a slave I/O bus and a slave port.

An interruption polling requester 62 is a block for outputting a communication access request at preset intervals in order to confirm a state of interruption in the slave side. The request is automatically output independent of an access from the CPU.

A DMA Ch. 0 requester 64 is a block for achieving DMA transmission. It automatically confirms, at preset intervals, whether a DMA request from the slave side is present, and performs necessary data transmission. It also has a function of DMA interface with the exterior of the chip.

A DMA Ch. 1 requester 66 is a block having the same function as that of the DMA CH 0 requester.

A communication bus arbiter 68, connected to the aforementioned requesters 60, 62, 64 and 66, is a block for arbitrating communication access requests from the requesters. By virtue of the arbitration function of the block 68, two or more accesses to the communication block do not occur.

A message data formatter 70, connected to the slave sequencer 54 and the communication bus arbiter 68, has a function of generating an address and data, to be transmitted, in accordance with a predetermined communication format, and a function of dividing a body portion of a received communication message into an address and data. A communication message has a header portion, a body portion, a CRC portion and a recovery portion. The body portion has an address and data. Since the length of the body portion can be changed in accordance with a communication command, it is necessary to rearrange the structure of the body portion.

The following two requesters, i.e., repliers are provided for the purpose of access request to the slave I/O bus. One of them, an I/O bus replier 72, is a block for outputting a bus access request to an I/O bus arbiter 76 in reply to a slave I/O bus access request supplied from the chip of the high-speed communication interface. The other one, a DMA replier 74, is a block for achieving DNA transmission to the master side. These blocks have a function of interfacing with a DMA outside the chip and a function of transmitting a response to confirmation as to whether a DMA request from the master side is present and necessary data of the DMA. They are operated only in the slave mode.

The I/O bus arbiter 76, connected to the I/O bus replier 72, the DMA replier 74 and a slave bus I/F 78 (to be described below) has a function of generating an error signal representing a bus hold time out, when a request from the replier 72 or 74 is kept waiting over a predetermined period of time. The two repliers and a secondary bus master (second CPU) are provided for the purpose of access request to the slave bus I/F 78. The I/O bus arbiter 76 has a function of arbitrating the slave bus in respect of the access request.

The slave bus I/F 78 has basic interface functions of transmitting an address, transmitting and receiving data and digital data and accessing the slave I/O bus. It also has a funneling function for making the width of data in the I/O bus the same as that of data in the repliers and a function of generating an error signal of a bus-time out, when an acknowledge is not returned from the I/O bus for a predetermined period of time.

In contrast to the MS block as described above, the communication block manages communication in the high-speed communication interface. Messages or data can be transmitted in parallel between the MS block and the communication block. The communication block has nine input and output signal lines connected to the exterior of the chip: four transmission lines, four reception lines and one transmission enable signal line. The transmission block comprises a flow controller 80, a transmitter 82, a line state detector 84, a receiver 86, a repeater 88 and a break/ emergency generator 90. Function blocks in the communication block will be described below.

The flow controller 80 is a block for controlling flow of transmission and reception of communication. It generates a header portion of communication message data and transmit it along with the body portion supplied from the MS block to the transmitter. It also interprets the body portion of communication message data supplied from the receiver, determines whether the message is a message addressed to the flow controller itself, a retransmitting message, a request for retransmission and an error message, and executes a suitable process.

The transmitter 82, connected to the flow controller 80 and the brake/emergency generator 90, changes the levels of signals in the transmission lines in accordance with the mode GCC4/GCC2 (gray coded coding 4/2) or MMC (modified Manchester code), so as to transmit a transmission request and transmission message data supplied form the flow controller 80. The GCC and MMC codes are devised so as to be adapted for communication within the apparatus. The GCC code has an object of extending the I/O bus of a relatively short distance in the equipment, so that a circuit load at each node can be minimized by using a plurality of transmission lines, thereby achieving high-speed data transmission. The MMC code, based on the Manchester code, has an object of providing simple and efficient bit synchronous communication means, under conditions without collision such as multidrop or counter. The coding systems (to be described later) are achieved by the transmitter.

The line state detector 84, connected to the flow controller 80, is a block for continually monitoring the line state, such as brake, emergency, no bit change in the line and the line space state.

The receiver 86, connected to the flow controller 80, is a block for receiving message data from the transmission line together with the line state detector 84. The receiver 86 confirms an bit level whether the data is normally received, while the flow controller 80 determines whether the received data has a meaning. The coding, as described above referring to the transmitter 82, is executed by the receiver 86.

The repeater 88, connected to the flow controller 80, the line state detector 84 and the receiver 86, is a block which operates in the network in the high-speed communication interface in the repeater mode and produces a communication direction control signal for the repeater. In the repeater mode, the chip also functions as a monitor for the transmission line and outputs a signal for monitoring the message data on the line or the line state. In this mode, the flow controller 80 and the transmitter 82 do not operate.

The brake/emergency generator 90 receives a brake/ emergency signal and output a brake/emergency signal to the transmitter 82. A request for transmitting these signals is executed by this block, independent of a regular route, thereby preventing a malfunction.

Blocks for realizing GCC and MMC coding in the communication block will now be described.

Transmission and reception units described below are included in the transmitter 82 and the receiver 86. FIG. 8 is a block diagram showing a transmission unit for transmitting a GCC code. The transmission unit comprises a parallel/ serial converter 92, a data encoder 94, a line reset code generator 86 and the aforementioned brake/emergency generator 90.

The parallel/serial converter 92 is a block which receives formatted parallel transmission message data and converts it to serial data. The converter 92 outputs the serial data to the data encoder 94. In the converter, parallel data are converted to 2-bit and 1-bit serial data, respectively in the communication coding modes (GCC4/GCC2).

The data encoder 94 receives an input from the other three circuits and encodes serial message data and a line reset code, after the completion of message transmission, in accordance with the GCC4/GCC2. When it receives a brake request from the brake/emergency generator 90, it preferentially changes a line signal to a braking state, even if a message is being transmitted.

A GCC4/GCC2 encoding method will be described later.

The line reset code generator 96 detects a state of a line signal after transmission message data has been transmitted, generates a line reset code based on the state of the line signal, and supplies the code to the data encoder 94. The brake/emergency generator 90 outputs a brake request to the data encoder 94 for a predetermined period of time in reply to the brake and emergency signals as described above. On the transmission line, brake and emergency signals are distinguished from each other, depending on the time when a signal is generated.

Figure 9:
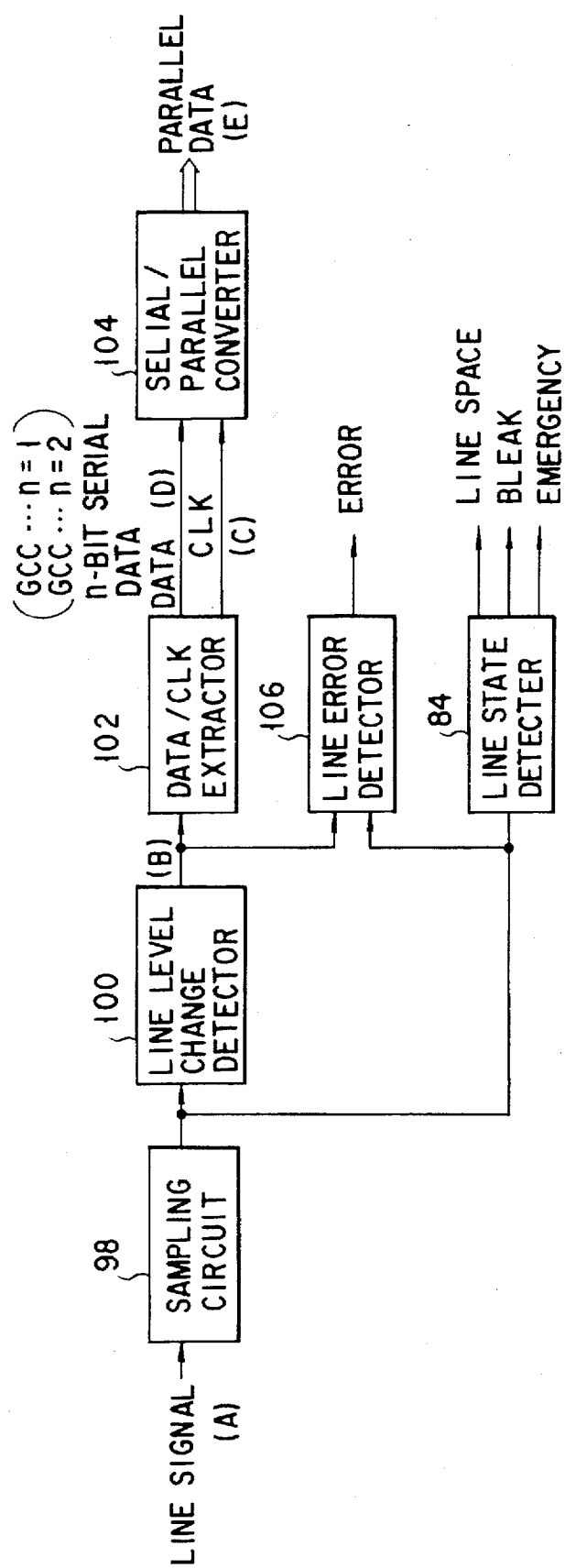
FIG. 9 is a block diagram showing a GCC code reception unit.

FIG. 9 is a block diagram showing the GCC code reception unit.

The reception unit comprises a sampling circuit 98, a line variation detector 100, a data/CLK extractor 102, a serial/parallel converter 104, a line error detector circuit 106 and the line state detector 84.

The sampling circuit 98 receives line signals and samples them with a system clock, so that they can be synchronized. An output of the sampling circuit 98 is supplied to the line variation detector 100, the line error detector circuit 106 and the line state detector. The line variation detector 100 detects variation (rising and falling) in each of the four line signals. An output of the line variation detector 100 is supplied to the data/CLK extractor 102 and the line error detector circuit 106.

The data/CLK extractor 102 extracts serial data (GCC4=2 bit, GCC2=1 bit) and a timing clock of bit variation from the variation in the line. The serial/parallel converter 104 converts an extracted n-bit serial data (GCC4:n=2, GCC2:n=1) to parallel data in accordance with the received timing clock.

The line error detector circuit 106 receives the output from the line variation detector 100 and generates an error signal, when the line variation does not conform to the GCC4/GCC2 coding. Two types of error are detected by this circuit: one is multi bit change (MBC) in a case where a plurality of lines change simultaneously and the other is no bit change (NBC) in a case where no line changes within a predetermined period of time.

The line state detector 84 detects a line state other then the above-described line errors. It detects a line space state, in which all the line signals are of high level for the predetermined period of time, and brake/emergency states in which the line signals are of low level for the predetermined period of time. The brake state and the emergency state are distinguished from each other depending on the time of detection.

FIG. 10 is a block diagram showing an MMC code transmission unit. The transmission unit comprises a parallel/serial converter 108, a data encoder 110 and the aforementioned brake/emergency generator 90. The parallel/serial converter 108 receives formatted parallel transmission message data and converts it to 1 bit serial data. The data encoder 110 encodes the serial message data and a line reset code after the completion of message transmission, in accordance with the MMC rules. When it receives a brake request from the break/emergency generator 90, it preferentially changes a line signal to a breaking state, even if a message is being transmitted.

The break/emergency generator 90 operates in the same manner as described above.

FIG. 11 is a block diagram showing an MMC code reception unit. The reception unit (receiver) comprises a sampling circuit 112, a line variation detector 114, a data/CLK bit detector 116, a start bit detector 118, a bit sync circuit 120, a data/CLK extractor 122, a serial/parallel converter 124 and the aforementioned line state detector 84.

The sampling circuit 112 samples line signals with a system clock, so that they can be synchronized. The line variation detector 114 detects variation (rising and falling) of a line signal. The data/CLK bit detector 116 extracts a data bit and a CLK bit from the line variation in accordance with the MMC rules, on the basis of a count value supplied form the bit sync circuit 120, and outputs an error signal when the line variation is not conformed to the rules. The start bit detector 118 receives an output from the line variation detector 114, detects a start bit which means a start of a communication message, and supplies, to a block concerned (e.g., the bit sync circuit 120), information that an operation of receiving message data is going to start. The bit sync circuit 120 counts a time until the next line variation is detected, every time a start bit or a normal CLK bit is detected. The count value is used in the data/CLK bit detector 116 in order to judge whether the line variation is normal or abnormal. The data/CLK extractor 122 extracts 1 bit serial data and a timing clock of bit variation from the line variation. The serial/parallel converter 124 converts the extracted 1 bit serial data to parallel data in accordance with the received timing clock. The line state detector 84 has the same function as described above.

A communication method of the present invention by means of the above communication system will now be described. First, a read cycle, in which data is read from a selected module (slave side controller), will be described referring to FIG. 12 which shows a diagram showing a communication procedure in a read cycle according to the method of the present invention.

In the read cycle, the master side controller 38 selects one of the slave side controllers 40A, 40B, 40C . . . and reads data from a specific I/O of the selected controller. This series of reading operations conventionally require a plurality of bus cycles, i.e., external reference cycles. In contrast, according to the present invention, the reading operations can be performed in one bus cycle. In the following description of the procedures, heading numerals denote communication sequences.

1) The main processor 8 of the master side controller 38 outputs an address A and an RD (read) signal to the master side high-speed communication interface 44M through the CPU bus 48. The address A includes an address of the master side high-speed communication interface, an address S1 of a slave side high-speed communication interface 44S to be selected, and an address a of the I/O on the slave side.

2) The master side high-speed communication interface 44M, which has received the above signal, generates, from the address A, the address S1 of the slave side high-speed communication interface 44S to be selected and the address a of the I/O of the interface, by the operations of the blocks shown in FIG. 7. The generated addresses S1 and a are supplied along with the RD (read) signal to the serial path (transmission path) 42 as serial data. At this time, data is transmitted through the transmission path at a high speed, for example, 40 MBPS, whereas data is transmitted through the conventional transmission path at a relatively low speed, for example, 64 KBPS. One module, i.e., a slave side controller, is selected by the address S1 from the plurality of chamber I/O control modules #1, #2, #3, . . . shown in FIG. 5.

3) The slave side high-speed communication interface 44S, selected by the address S1, outputs the address a and the RD signal to the I/O side (the motor control, AD/DA and DI/DO) through the slave bus. In this case, serial reception data, which has been serially input, is recovered to parallel data.

4) The I/O identified by the address a outputs to the slave side high-speed communication interface 44S, in parallel, data D selected by the address a and the RD signal and a response ACK signal representing that data is normally read.

5) The slave side high-speed communication interface 44S of the address S1, which receives the above signal, serially outputs the data D supplied from the I/O side and an OK signal representing that I/O access has been normally executed, to the serial path (transmission path) 42.

6) The master side high-speed communication interface 44M, which receives the above signal, outputs the input data D and the response ACK signal representing that the access has been normally executed, to the main processor 8. As a result, the data D in the predetermined address a of the I/O is read and fetched by the CPU on the master side.

The above series of reading operations of the sequences 1) to 6) are executed in one bus cycle (external reference cycle) of the main processor (CPU) 8. Moreover, since a data reading operation is also performed in the bus cycle, high-speed transmission at a rate of, for example, 40 MBPS can be achieved.

In other words, during one external reference cycle of the main processor 8, various instructions output from the main processor 8 on the master side are serially incorporated by the master side high-speed communication interface 44M and transmitted at a high speed to the slave side. The slave side high-speed communication interface 44S, which receives the instructions, rearranges the received data in parallel, accesses the I/O and transmits the data to the master side in the procedures in the order opposite to that as described above.

Thus, the master side main processor 8 can directly access the slave side I/O in a level similar to, for example, the memory in the master side. Accordingly, the access time in a reading operation can greatly be reduced as compared to the conventional method.

A write cycle according to the present invention will be described referring to FIG. 13 which shows a diagram showing a communication procedure in a write cycle according to the method of the present invention.

In the write cycle, the master side controller 38 selects one of the slave side controllers and writes data in a specific I/O of the selected controller. This series of writing operations can be performed in one bus cycle, as in the case of the read cycle described above. In the following description of the procedures, heading numerals denote communication sequences.

1) The main processor 8 of the master side controller 38 outputs an address A, data D to be written in the I/O and an WR (write) signal to the master side high-speed communication interface 44M through the CPU bus 48. The address A includes an address of the master side high-speed communication interface, an address of the master side high-speed communication interface, an address S1 of a slave side high-speed communication interface 44S to be selected and an address a of the I/O on the slave side.

2) The master side high-speed communication interface 44M, which has received the above signal, generates, from the address A, an address S1 of the slave side high-speed communication interface 44S to be selected and an address a of the I/O of the interface, by the operations of the blocks shown in FIG. 7. The generated addresses S1 and a are supplied along with the data D and the WR (write) signal to the serial path (transmission path) 42 as serial data. In this case also, data is transmitted through the transmission path at a high speed, for example, 40 MBPS, higher than that in the conventional art. One module, i.e., a slave side controller, is selected by the address S1 from the plurality of chamber I/O control modules #1, #2, #3, ... shown in FIG. 5.

3) The slave side high-speed communication interface 44S, selected by the address S1, outputs the address a, the data D and the WR signal to the I/O side (the motor control, AD/DA and DI/DO) through the slave bus. In this case, serial reception data, which has been serially input, is recovered to parallel data.

4) The I/O designated by the address a writes the data D in a portion selected by the address a and the WR signal and outputs to the slave side high-speed communication interface 44S, in parallel, a response ACK signal representing that data has been normally written.

5) The slave side high-speed communication interface 44S of the address S1, which has received the above signal, serially outputs an OK signal representing that I/O access has been normally executed, to the serial line (transmission path) 42.

6) The master side high-speed communication interface 44M, which has received the above signal, outputs a response ACK signal representing that the access has been normally executed, to the main processor 8. As a result, the data D of the main processor 8 on the master side is written in the predetermined address a of the I/O.

The above series of writing operations of the sequences 1) to 6) are executed in one bus cycle (external reference cycle) of the main processor (CPU) 8. Thus, the master side main processor 8 can directly access the slave side I/O in a level similar to, for example, the memory on the master side. More specifically, when the main processor 8 sends a plurality of commands to the final address of an I/O, the master side high-speed communication interface fetches parallel data, converts it to serial data and transmits the serial data to the slave side. The slave side high-speed communication interface, which receives the data, converts it to parallel data and accesses the I/O to write the data. This series of operations are executed in one bus cycle.

According to the conventional method, a period of time required to read data once is an order of several hundreds of $\mu$ sec to several msec. In the above-described read and write cycles, according to the embodiment of the present invention, access can be completed within 10 $\mu$sec. The period of time for processing data is greatly reduced, thus achieving a high-speed processing.

Figure 14:
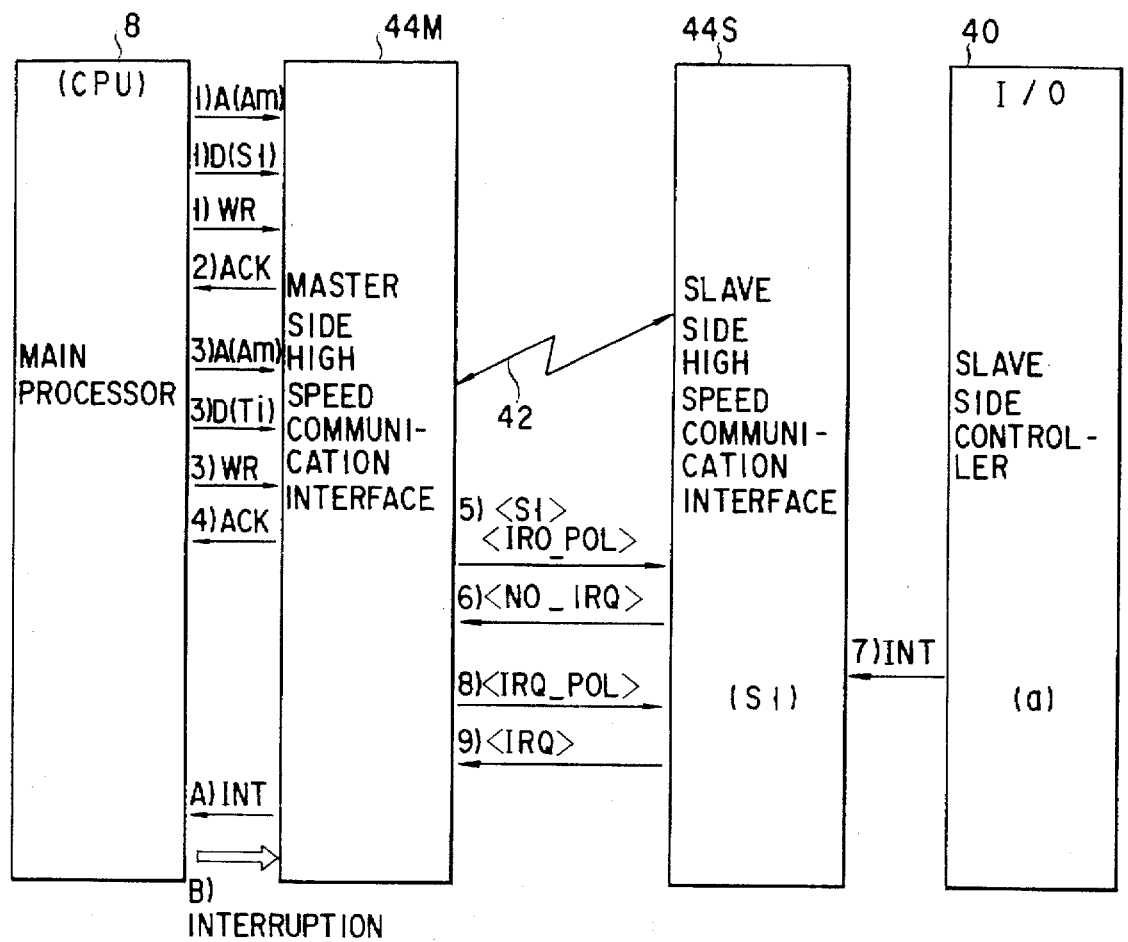
FIG. 14 is a diagram showing a communication procedure in an interruption cycle according to the method of the present invention.

An interruption cycle of the present invention will now be described referring to FIG. 14 which shows a diagram showing a communication procedure in an interruption cycle according to the method of the present invention.

The interruption cycle is to detect an interruption request from an I/O. In the following description of the procedures, heading numerals denote communication sequences.

1) The main processor 8 of the master side controller 38 designates, in an address A, an address Am of the master side high-speed communication interface 44M and a slave S1 in which data D is polled. The main processor 8 further generates an WR (write) signal.

2) The master side high-speed communication interface 44M, which has received the WR signal, stores S1 in an internal memory and outputs a confirmation ACK signal to the main processor 8.

3) The main processor 8, which has received the ACK signal, designates, in the address A, the address Am of the master side high-speed communication interface 44M and an interval time $T_i$ in which data D is polled. The main processor 8 further generates a WR signal.

4) The master side high-speed communication interface 44M, which has received the WR signal, stores $T_i$ in an internal memory and outputs a confirmation ACK signal to the main processor 8.

5) The master side high-speed communication interface 44M, which has received the WR signal, outputs the address S1 and a command IRQ_POL to the serial path 42 (transmission path), in order to inquire at intervals $T_i$ whether interruption occurs with respect to the slave side high-speed communication interface 44S.

6) When an interruption request is not generated by the I/O under the control of the slave side high-speed communication interface 44S, which receives the command IRQ_POL, the interface 44S outputs a signal NO_IRQ, representing that there is no command IRQ_POL, to the transmission path, thus responding to the master side main processor 8.

7) Assume that an I/O generates a signal INT representing interruption to the slave side high-speed communication interface 44S at a time.

8) In this case, the master side main processor 8 outputs the address S1 and the command IRQ_POL to the transmission path, in order to inquire whether interruption occurs at intervals $T_i$ with respect to the slave side high-speed communication interface 44S.

9) The slave side high-speed communication interface 44S, which has received the command IRQ_POL, sends a signal IRQ representing interruption request to the master side high-speed communication interface 44M, since the I/O generates the interruption request as described above.

A) The master side high-speed communication interface 44M, which has received the signal IRQ, outputs a signal INT representing interruption to the main processor 8.

B) The main processor 8, which has received the signal INT, performs interruption control with respect to the I/O with the read and write cycles as described above.

In this manner, the interruption cycle is completed.

Next, a DMA (direct memory access) cycle according to the present invention will be described referring to FIG. 15 which shows a diagram showing communication procedures in a DMA cycle according to the method of the present invention.

To execute the DMA cycle, the main processor 8 is used or a special controller (DMAC) is provided. The DMA cycle is to directly transfer data in an I/O to the memory in the main processor on the master side by means of hardware. For this purpose, the I/Os and the memory are connected by a bus, not via the master side CPU. When the CPU of the main processor temporarily gives authorization to the DMAC, the DMAC operates as if it were a CPU, so that the data can be transferred from the I/O to the memory. In other words, in the DMA, data is added to the interruption operation as described above.

In the following description of the procedures, heading numerals denote communication sequences.

1)–4) In the same manner as in the write cycle, the procedures 1) to 4) are repeated the number of times corresponding to the number of slave registers which should be set in the DMA cycle.

5)–6) The procedures 5) to 6) are repeated the number of times corresponding to the number of master registers which should be set in the DMA cycle to perform register access to the master side high-speed communication interface 44M.

7) The master side high-speed communication interface 44M outputs a polling signal to the transmission path, to determine whether the slave side high-speed communication interface 44S outputs a DMA request (DRQ).

8) If the slave side high-speed communication interface 44S does not output a DRQ request, it outputs a signal NO_DRQ, representing that no DRQ request is present, to the transmission path, thereby responding to the master side.

9) When an I/O outputs a signal DRQ (DMA request) to the corresponding slave side high-speed communication interface 44S and then the high-speed communication interface 44S has completed its internal preparation, it fetches DMA data D from the slave bus.

10) In the same manner as in the procedure 7), the master side high-speed communication interface 44M determines whether the slave side high-speed communication interface 44S outputs a DMA request (DRQ).

11) The slave side high-speed communication interface 44S, which has received the polling signal, outputs a signal DRQ to the transmission path, since it received the signal DRQ from the I/O, thereby informing the master side high-speed communication interface 44M of the presence of the DMA request.

12) The master side high-speed communication interface 44M, which has received the DRQ signal, reads the DMA data D fetched by the slave side high-speed communication interface 44S.

13) The slave side high-speed communication interface 44S, which has received the DMA data D, outputs the data D. The master side high-speed communication interface 44M stores the data D in an internal register.

14) The master side high-speed communication interface 44M supplies to the DMAC a signal representing that the DMA data D has been stored.

15) The DMAC, which has received the signal, reads the DMA data from the master side high-speed communication interface 44M.

Thereafter, the procedures 7) to 15) are repeated the number of times corresponding to the number of the transmitted DMA data, thus completing the DMA operation.

An EMG (emergency) cycle according to the present invention will now be described referring to FIGS. 16A and 16B which show diagrams showing communication procedures in a DMA cycle according to the method of the present invention. FIG. 16A shows a case in which an EMG signal is output to the slave side and FIG. 16B shows a case in which an EMG signal is output to the master side.

In the EMG cycle executed by means of a break signal (BREAK) in a communication circuit, when, for example, fire breaks out in a treatment machine and a break signal is generated, a signal of the master side high-speed communication interface is compulsorily fetched by a slave side high-speed communication interface. The break signal is represented as a continuous signal of a low level, which is long enough to be distinguishable from noise unexpectedly mixed with signals.

1) An EMG signal is input to the master side high-speed communication interface 44M.

2) The master side high-speed communication interface 44M drives the communication path into an EMG state.

3) At this time, all the slave side high-speed communication interfaces 44S output an EMG signal to the I/Os and supply the information that the EMG signal is output.

4) On the other hand, in case of emergency of an I/O, an EMG signal is input to the slave side high-speed communication interface which controls the I/O.

5) The slave side high-speed communication interface, which has received the EMG signal, drives the communication path into an EMG state.

6) At this time, the other slave side high-speed communication interfaces output an EMG signal to the respective I/Os controlled by the units. At the same time, the master side high-speed communication interface 44M outputs an EMG signal to the main CPU and supplies the information that the EMG signal is output.

In this manner, the EMG cycle is completed.

An encoding method, used between the master and slave sides in the above-described communication system, will be described below in detail.

The embodiment of the present invention uses the MMC (modified Manchester coding) executed by the circuits shown in FIGS. 10 and 11 and the GCC (gray coded coding) executed by the circuits shown in FIGS. 8 and 9. The GCC includes two types of GCC4 and GCC2. As described before, the MMC/GCC codes are devised to achieve communication within an equipment. An object of the MMC code, based on the Manchester coding, is to provide simple and efficient bit synchronous communication means, under conditions without collision such as multidrop or counter. An object of the GCC code is to extend a relatively short I/O bus in the equipment, so that a circuit load at each node can be minimized by using a plurality of (e.g., two or four) transmission lines, thereby achieving high-speed data transmission.

There are a number of known transmission methods for achieving communication between nodes. However, since a main object of those methods is to decrease the number of communication lines to a minimum (e.g., two or four), the methods have the following disadvantages.

(1) A complicated controller is required.

(2) The transmission speed is low.

Further, as regards start/stop synchronization, since signals must be synchronized byte by byte due to absence of clock components, 2 or 3 bits of 8 bits are required for start and stop bits. In addition, since the chip must generate clocks 8 to 16 times the transmission rate for sampling, it is impossible to increase the transmission rate due to the limit of the operation speed of the chip. As regards normal synchronization, a long period of time is required for preamble. Moreover, clock extraction using a PLL circuit is complicated.

However, the above problems can be solved to some degree by the MMC/GCC codes. In this case, the number of transmission paths is as follows: MMC1 uses one line for each of transmission and reception; similarly, GCC2 uses two lines for each; and GCC4 uses four lines for each.

The rules of the coding methods will be described below.

In MMC1, rising in the level of the transmission lines is coded as "1" and falling in the level thereof is coded as "0".

In GCC2, the variations in the transmission lines are respectively coded as "0" and "1".

In GCC4, the variations in the transmission lines are respectively coded as "00", "01", "10" and "11".

The GCC has characteristics that a plurality of transmission lines do not vary in level and variation in any transmission line occurs at regular intervals. The MMC has a characteristic that the sampling rate can be as low as 6 times the bit rate.

The GCC is advantageous in that: a clock can be extracted by a simple circuit; since only one bit in every line varies simultaneously, variation in phase need not be taken into consideration; the sampling rate can be as low as at least three times the bit rate; and high-speed transmission can be achieved.

Figure 17:
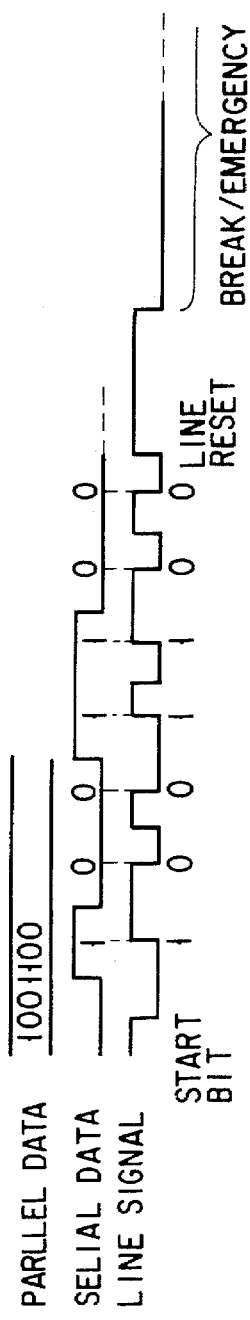
FIG. 17 is a diagram showing waveforms in portions of the transmission unit shown in FIG. 10.

An encoding method of MMC1 will now be described referring to FIG. 17 which shows a diagram showing waveforms in portions of the transmission unit shown in FIG. 10.

First, when parallel data a to be transmitted is input to the parallel/serial converter 108, the data is converted to 1-bit serial data β. A line signal γ is generated by the data encoder 110 from the serial data β and transmitted.

In this case, when the serial data is "1", the line signal is changed from "Low" to "High", and when the serial data is "0", the line signal is changed from "High" to "Low". Since the transmission line is kept "High" when data is not transmitted, a start bit is added to the data by setting the line "Low", when the transmission starts. A data bit is extracted from the transmitted line signal at intervals determined by a CLK bit set in the reception unit as will be described later.

When transmission of the message data is completed, if the transmission line is "Low", it is reset to "High", i.e., the line reset is necessarily executed. When the break/emergency generator 90 receives a break/emergency issue request, it outputs a line signal of "BREAK" in whatever line state. In the data encoder 110, break and emergency states are not distinguishable from each other and all the line signals γ are set "Low" for a period of time in which a break request is being input. The time management in this time is executed by the break/emergency generator 90.

Figure 18:
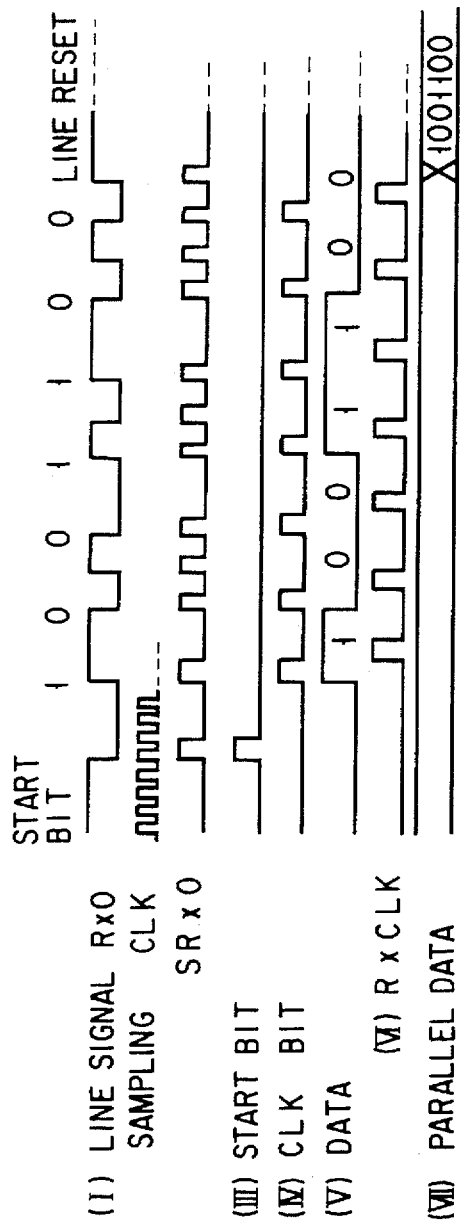
FIG. 18 is a diagram showing waveforms in portions of the MMC code reception unit shown in FIG. 11.

An operation of an MMC1 reception unit will be described referring to FIG. 18 which shows a diagram showing waveforms in portions of the MMC code reception unit shown in FIG. 11.

First, a line signal I is sampled and synchronized by the sampling circuit 112 with a sampling CLK of, for example, 6 times the transmission rate, thereby forming a line state variation signal II (SPx0). Based on the signal SPx0, a start bit III, a CLK bit IV, 1-bit serial data V, and an RxCLK signal VI are respectively generated by the data/CLK bit detector 116, the start bit detector 118, the bit sync circuit 120 and the data/CLK extractor 122. The serial/parallel converter 124 converts the serial data V and the RxCLK signal VI into parallel data VII, thereby recovering the original data.

Figure 19:
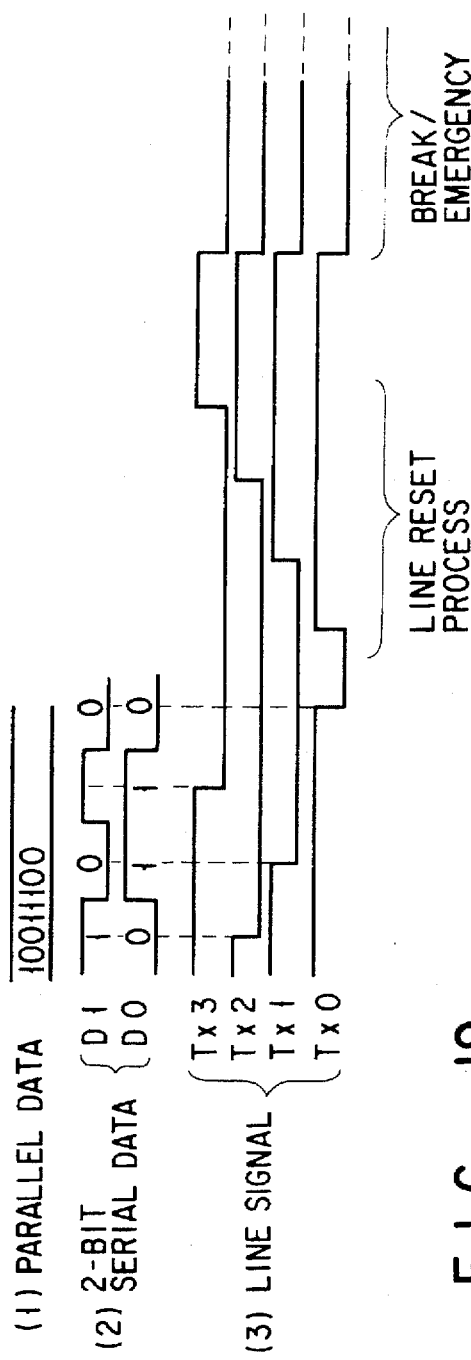
FIG. 19 is a diagram showing waveforms in portions of the GCC code transmission unit shown in FIG. 8.

An operation of a GCC4 transmission unit will be described referring to FIG. 19 which shows a diagram showing waveforms in portions of the GCC code transmission unit shown in FIG. 8.

Parallel data (1) to be transmitted is converted by the parallel/serial converter 92 to 2-bit serial data (2). The data encoder 94 converts the serial data (2) to a line signal (3), i.e., 4-bit parallel data, and transmits the parallel data. In this case, as described above, when the serial data (2) is "10", the level of a line Tx2 of the four lines is varied. When the data is "01", the level of a line Tx1 is varied. When the data is "11", the level of a line Tx3 is varied. When the data is "00", the level of a line Tx0 is varied. A plurality of lines do not vary simultaneously. A variation in any line occurs at the predetermined intervals. Thus, only one line is varied in level at a time and a specific meaning is given to the variation.

In a line reset procedure after message data has been transmitted, the line reset code generator 96 encodes and outputs a line reset code. At this time, the reset code sequentially causes the lines Tx0 to Tx3 to be varied from "Low" to "High". If a line has already been set "High", the next line is set "High", thus setting all the lines "High". In this case, in data transmission, it is unnecessary to provide a start bit, such as preamble, i.e., the data can be transmitted immediately. Moreover, when the break/emergency generator 90 receives a break/emergency issue request, it outputs a line signal of "BREAK" in whatever line state. In the data encoder 94, break and emergency states are not distinguishable from each other and all the line signals are set "Low" for a period of time in which a break request is being input. The time management in this time is executed by the break/emergency generator 90.

In actual data transmission, the data encoder 94 executes 8 to 16 bit CRC (Cyclic Redundancy Checks) to confirm whether all the data have been correctly transmitted (whether any bit is missing) at the end of the transmission. With the CRC, the reset operation for setting all the lines "High" need not be necessarily performed. For example, if the number of bytes of message data to be transmitted in the case of GCC4 is set to a multiple of 4, the reset operation can be unnecessary. More specifically, if 18-bit message data is to be transmitted, 2 bits are added to the data to make the number of bytes a multiple of 4, i.e., 20-bit message data is transmitted. In this case, all the lines can be set "High" after the CRC check has been completed, without a reset operation.

Figure 20:
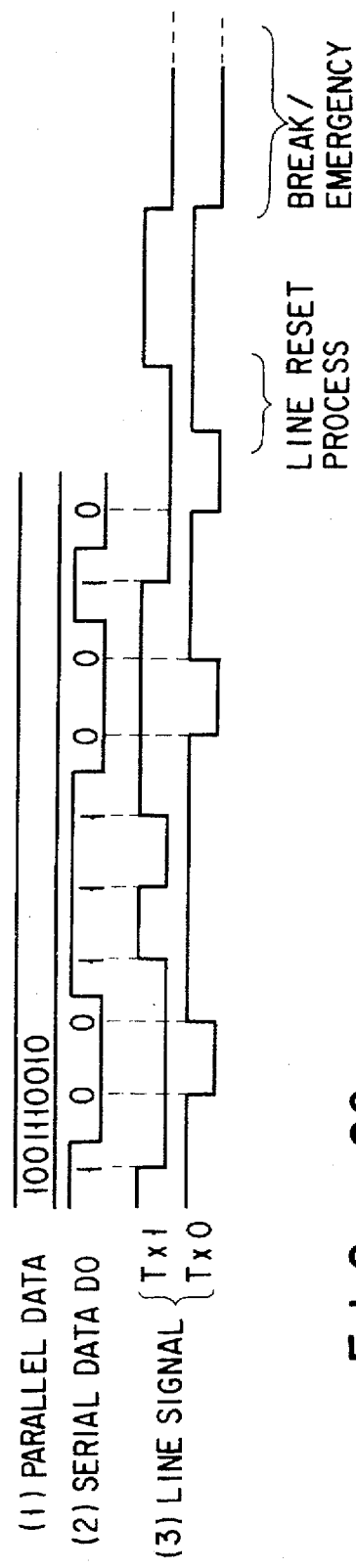
FIG. 20 is a diagram showing waveforms in portions of the GCC code reception unit shown in FIG. 9.

An operation of a GCC4 reception unit will be described referring to FIG. 20 which shows a diagram showing waveforms in portions of the GCC code reception unit shown in FIG. 9.

Input line signals A (in four lines) are sampled and synchronized by the sampling circuit 98 with a sampling CLK of, for example, four times that of the transmission rate, thereby generating line state variation signals B (SRx0 to SRx3) for the respective lines. The data/CLK extractor 102 generates serial data of n bits (in this embodiment, 2 bits) and a reception CLK (RxCLK) signal C from the four signals (SRx0 to SRx3). The reception CLK signal C can be easily obtained by processing the four signals (SRx0 to SRx3) by an exclusive OR circuit (EX-OR).

The serial/parallel converter 104 converts the serial data D and the RxCLK signal C into parallel data E, thereby recovering the original data.

Figure 21:
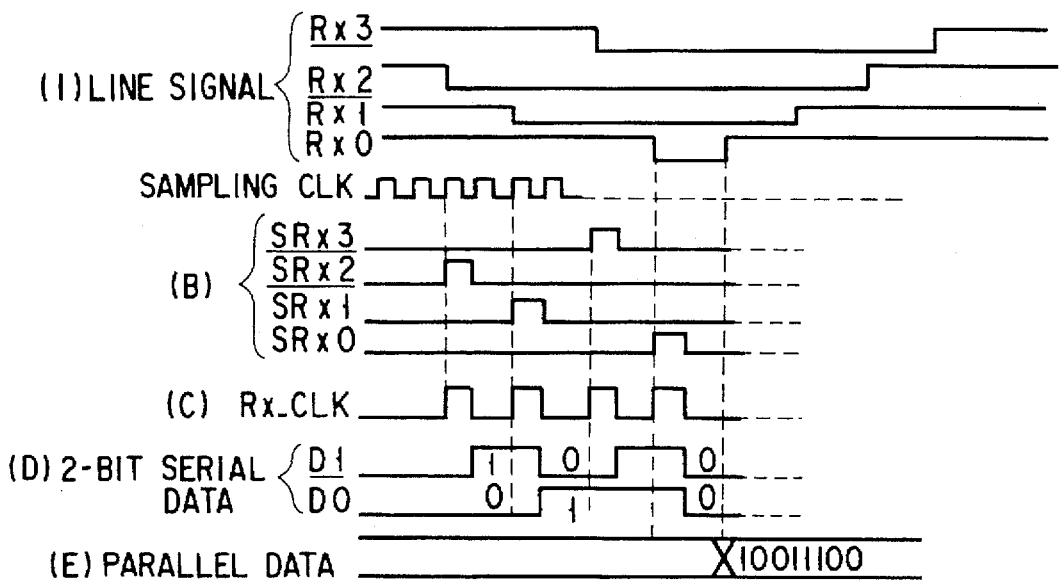
FIG. 21 is a diagram showing waveforms in portions of the GCC code transmission unit shown in FIG. 8.

An operation of a GCC2 transmission unit will be described referring to FIG. 21 which shows a diagram showing waveforms in portions of the GCC code transmission unit shown in FIG. 8.

The GCC2 is different from the GCC4 only in that the variations in two lines are meaningful. The other points are the same as those in the GCC4. Parallel data (1) to be transmitted is converted by the parallel/serial converter 92 to 2-bit serial data (2). The data encoder 94 converts the serial data (2) to a line signal (3), i.e., 2-bit parallel data, and transmits it. In this case, as described above, when the serial data (2) is "1", the level of a line Tx1 of the two lines is varied. When the data is "0", the level of a line Tx0 is varied. The two lines do not vary simultaneously. As in the case of the GCC4, a variation in either line occurs at the predetermined intervals. Thus, either one of the two lines is necessarily varied in level, and a specific meaning is given to the variation.

In a line reset procedure after message data has been transmitted, the line reset code generator 96 encodes and outputs a line reset code. At this time, the reset code sequentially causes the lines Tx0 and Tx1 to be varied from "Low" to "High". If a line has already been set "High", the next line is set "High", thus setting both the lines "High". If even parity CRC check is performed, a line reset operation is unnecessary. In this case, data can be transmitted immediately without adding a start bit or the like, as in the case of the GCC4.

When the break/emergency generator 90 receives a break/emergency issue request, it outputs a line signal of "BREAK" in whatever line state. In the data encoder 94, break and emergency states are not distinguishable from each other and all the line signals are set "Low" for a period of time in which a break request is being input. The time management in this time is executed by the break/emergency generator 90.

Figure 22:
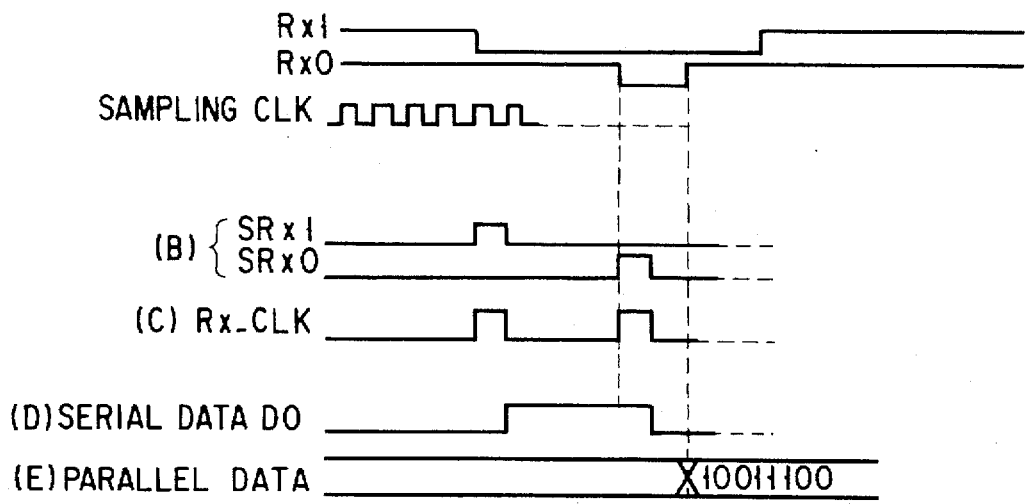
FIG. 22 is a diagram showing waveforms in portions of the GCC code reception unit shown in FIG. 9.

An operation of a GCC2 reception unit will be described referring to FIG. 22 which shows a diagram showing waveforms in portions of the GCC code reception unit shown in FIG. 9.

Input line signals A (in two lines) are sampled and synchronized by the sampling circuit 98 with a sampling CLK of, for example, twice that of the transmission rate, thereby generating line state variation signals B (SRx0, SRx1) for the respective lines. The data/CLK extractor 102 generates serial data of n bit (in this embodiment, 1 bit) and a reception CLK (RxCLK) signal C from the two signals (SRx0, SRx1). The reception CLK signal C can be easily obtained by processing the two signals (SRx0, SRx1) by an exclusive OR circuit (EX-OR).

The serial/parallel converter 104 converts the serial data and the RxCLK signal C into parallel data E, thereby recovering the original data.

As described above, with the GCC4/GCC2 methods, since only one of a plurality of lines is necessarily varied so that a specific meaning is given to the variation, high-speed transmission can be achieved. For example, although an actual line speed is limited to about 10 MHz (40 MHz in the case of a system clock), the GCC allows a transmission rate of 40 MBPS. Further, since redundant bits, such as a start bit and a stop bit, are reduced, the circuit load can be reduced, which allows much higher-speed data transmission. Moreover, since the sampling speed can be as low as 4 to 6 times the transmission rate, the circuit design is simple. Furthermore, an internal clock (CLK) signal is easily obtained only by processing the received data with an exclusive OR circuit. Therefore, for example, a PLL (Phase Locked Loop) circuit or a clock line, which have been required in the conventional art, are unnecessary, resulting in a simple structure.

In the encoding method of the present invention, since the state of only one line is varied at a time, the circuit is resistant to noise. The method is particularly suitable for a semiconductor equipment using a number of noise sources such as high-frequency circuits or magnets.

To reduce transmission errors, a large phase margin on a transmission path is required. With the GCC as described above, since the phase margin can be extended to ±25%, depending on the sampling speed, transmission delay does not easily occur and a satisfactory transmission result can be obtained.

In the above description of the embodiment, communication in a semiconductor equipment is described as an example. However, the present invention is not limited to the embodiment.

As has been described above, according to the present invention, the following effect and advantage can be obtained.

Since data is read from or written in a predetermined slave side controller within one bus cycle of the master side controller, the transmission time can be reduced and the processing speed can be increased.

Since high-speed transmission can be achieved without greatly increasing the number of transmission lines, it is possible to provide a communication method optimal for communication in middle or short distance, such as communication in a semiconductor equipment.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A communication method for performing communication between a master device and a plurality of slave devices, which comprises the steps of:
    preparing, in the master device, transmission data including at least address data of a destination and operation command data to be transmitted to the destination, in a form of bit serial data;
    converting the bit serial data to line signals corresponding to each of the address data and the operation command data to send at least one of the line signals to at least one of a plurality of parallel coded lines at each of a plurality of predetermined time intervals;
    de-converting, in at least one of the slave devices, the line signals on the coded lines to the bit serial data;
    decoding the bit serial data to the transmission data including address data and operation command data; and
    executing at least one of data writing and reading in at least one of the slave devices corresponding to the address data, in accordance with the operation command data,
    wherein said steps are completed within one bus cycle of the master device.

2. The communication method according to claim 1, further comprising the step of outputting, from at least one of the slave devices, a break/emergency signal to cause the line signals to be low in level for at least a predetermined period of time.

3. The communication method according to claim 1, further comprising the step of periodically polling the slave devices by the master device, to confirm whether the slave devices receive an interruption request.

4. The communication method according to claim 3, further comprising the step of outputting, from at least one of the slave devices, a break/emergency signal to cause the line signals to be low in level for at least a predetermined period of time.

5. The communication method according to claim 1, wherein the preparing step includes preparing read command data as the operation command data; and the executing step includes reading message data from the slave device corresponding to the address data and transmitting the message data to the master device.

6. The communication method according to claim 1, wherein the preparing step includes preparing write command data as the operation command data and write message data; the converting step includes converting each of the address data, the write command data and the write message data to line signals to send the line signals to the parallel coded lines; and the executing step includes writing the write message data in at least one of the slave devices which is designated by the address data.

7. The communication method according to claim 1, wherein the converting step includes varying levels of the line signals in accordance with the bit serial data of the transmission data.

8. The communication method according to claim 7, wherein the converting step includes raising and lowering the levels of the line signals in accordance with the bit serial data.

9. A communication apparatus comprising:
    a communication path including parallel coded lines;
    a master side controller for preparing transmission data including at least address data of a destination and operation command data to be transmitted to the destination in a form of bit serial data;
    a master side interface, connected to the master side controller, for converting the bit serial data to line signals corresponding to each of the address data and the operation command data supplied from the master side controller to send at least one of the line signals to at least one of a plurality of parallel coded lines at each of a plurality of predetermined time intervals, said plurality of parallel coded lines being connected to the master side interface; and
    a plurality of slave side controllers each connected to the master side interface via the parallel coded lines and each including a de-converter for de-converting the line signals to the bit serial data, a decoder for decoding the bit serial data to the address data and operation command data, and means for executing at least one of message data writing and reading in accordance with the operation command data,
    wherein operations of the master side controller, the master side interface and the slave side controllers are performed within one bus cycle of the master side controller.

10. The communication apparatus according to claim 9, wherein the slave side controllers include means for outputting a break/emergency signal to cause the line signals to be low in level for at least a predetermined period of time.

11. The communication apparatus according to claim 9, wherein the master side interface includes means for periodically polling the plurality of slave side controllers, to confirm whether the slave side controllers receive an interruption request.

12. The communication apparatus according to claim 11, wherein the slave side controllers include means for outputting a break/emergency signal to cause the line signals to be low in level for at least a predetermined period of time.

13. The communication apparatus according to claim 9, wherein the master side controller prepares read command data as the operation command data; and the slave side controllers read message data from at least one of the slave side controllers which is designated by the address data and transmit the line signals in accordance with the read message data to the master side interface.

14. The communication apparatus according to claim 9, wherein the master side controller prepares write command data as the operation command data and write message data; the master side interface transmits the line signals corresponding to each of the address data, the write command data and the write message data to the plurality of the slave side controllers through the parallel coded lines; and at least one of the slave side controllers which is designated by the address data includes storing means for storing the write message data.

15. The communication apparatus according to claim 9, the master side interface includes means for varying levels of the line signals in accordance with the bit serial data of the transmission data.

16. The communication apparatus according to claim 15, wherein the master side interface includes means for raising and lowering the levels of the line signals in accordance with the bit serial data.

17. The method according to claim 1, which includes transmitting message data from the at least one of the slave devices to the master device and detecting a receiving error of the message data in the master device.

18. The method according to claim 1, which includes detecting a receiving error of the transmission data from the master device in each of the slave devices.

19. The method according to claim 1, wherein the transmission data is transmitted to the destination in a form of two-bit serial data, and the parallel coded lines include four coded lines associated with four binary codes of 1 1, 1 0, 0 1 and 0 0, respectively and the converting step converts the two-bit serial data to four line signals and transmits the four line signals to at least one of the four coded lines.

20. The apparatus according to claim 9, wherein each of the slave side controllers includes means for transmitting message data to the master side controller and means for detecting a receiving error of the message data in the master side controller.

21. The apparatus according to claim 9, wherein the each of the slave side controllers includes means for detecting a receiving error of the transmission data from the master side controller.

22. The apparatus according to claim 9, wherein the parallel coded lines include four coded lines associated with four binary codes of 1 1, 1 0, 0 1 and 0 0, respectively and the master side controller prepares two-bit serial data as the transmission data, the master side interface controller converts the two-bit serial data to four line signals and transmits the four line signals to at least one of the four coded lines.

23. A method of encoding and decoding transmission data transmitted between a master device and at least one slave device comprising the steps of:

converting the transmission data to two-bit serial data;

converting at least one of the two-bit serial data to at least one of four line signals at each of a plurality of predetermined time intervals, to send at least one of the four line signals to at least one of four coded lines at each of said plurality of predetermined time intervals, the four coded lines being associated with four binary codes of 1 1, 1 0, 0 1 and 0 0, respectively;

detecting rising and falling levels of the line signals for each of the four coded lines to read out binary codes of the coded lines in response to the rising and falling levels of the line signals;

decoding the binary codes of the coded lines to provide decoded data corresponding to the two-bit serial data; and reconstructing the transmission data from the decoded data.

24. The method according to claim 23, wherein the step of converting said at least one of the two-bit serial data includes detecting variations of levels of at least two of the line signals at one of the predetermined time intervals as an error.

25. The method according to claim 23, wherein the step of converting said at least one of the two-bit serial data includes detecting an error by detecting non-variation of at least one of the line signals over a period of time longer than a period of time between a selected one of the predetermined time intervals and a next one of the predetermined time intervals.

* * * * *